US012688435B2

(12) United States Patent
Baker et al.

(10) Patent No.: US 12,688,435 B2
(45) Date of Patent: Jul. 21, 2026

(54) METHODS AND SYSTEMS FOR PROTECTING GENETIC DATA

(71) Applicant: Othram, Inc., The Woodlands, TX (US)

(72) Inventors: Lee C. Baker, The Woodlands, TX (US); David A. Mittelman, The Woodland, TX (US); John W. Fondon, III, Tomball, TX (US)

(73) Assignee: Othram, Inc., The Woodlands, TX (US)

( * ) Notice: Subject to any disclaimer, the term of this patent is extended or adjusted under 35 U.S.C. 154(b) by 542 days.

(21) Appl. No.: 18/361,737

(22) Filed: Jul. 28, 2023

(65) Prior Publication Data

US 2024/0086721 A1 Mar. 14, 2024

Related U.S. Application Data

(60) Provisional application No. 63/405,745, filed on Sep. 12, 2022.

(51) Int. Cl.
*G06N 3/123* (2023.01)

(52) U.S. Cl.
CPC ..................................... *G06N 3/123* (2013.01)

(58) Field of Classification Search
CPC ........ G16B 20/00; G16B 40/20; G16B 10/00; G06N 3/123; G06N 20/00
USPC .......................................................... 706/13
See application file for complete search history.

(56) References Cited

U.S. PATENT DOCUMENTS

| | | | | |
|---|---|---|---|---|
| 8,285,486 | B2 * | 10/2012 | Martin | ................... G16B 20/40 |
| | | | | 702/19 |
| 8,372,584 | B2 * | 2/2013 | Shoemaker | .......... C12Q 1/6881 |
| | | | | 435/6.12 |
| 9,094,211 | B2 * | 7/2015 | Klevan | ................. H04L 9/3242 |
| 9,276,911 | B2 * | 3/2016 | Wang | ..................... H04L 9/3239 |
| 9,536,047 | B2 * | 1/2017 | Ayday | .................... G16B 50/00 |
| 10,673,826 | B2 * | 6/2020 | Sinclair | ................. H04L 9/0618 |
| 11,954,614 | B2 * | 4/2024 | Wong | ...................... G06N 7/01 |
| 2008/0220422 | A1 | 9/2008 | Shoemaker et al. | |
| 2008/0255768 | A1 | 10/2008 | Martin et al. | |
| 2013/0103951 | A1 | 4/2013 | Klevan et al. | |

(Continued)

OTHER PUBLICATIONS

International Search Report and Written Opinion for International Patent Application PCT/US2023/029039 dated Nov. 2, 2023.

*Primary Examiner* — Pritham D Prabhakher

(74) *Attorney, Agent, or Firm* — Foley & Lardner LLP

(57) ABSTRACT

Systems, methods, and computer-readable storage media for comparing genetic data of at least two individuals to determine a relationship between the at least two individuals and to present the relationship while providing privacy protection of certain genetic data. One system includes a one or more processing circuits to receive at least a portion of a first genetic dataset and at least a portion of a second genetic dataset. Further, the one or more processing circuits to identify a first set of DNA markers and identify a second set of DNA markers, and wherein the first set of DNA markers and the second set of DNA markers at least partially correspond. Further, the one or more processing circuits to determine a plurality of relationship indices, generate a relationship interface that includes graphical representations, and provide the relationship interface.

17 Claims, 13 Drawing Sheets

(56)  References Cited

U.S. PATENT DOCUMENTS

| | | | | |
|---|---|---|---|---|
| 2014/0075183 | A1* | 3/2014 | Wang | G16B 30/00 |
| | | | | 713/150 |
| 2016/0224735 | A1* | 8/2016 | Ayday | G16B 50/30 |
| 2016/0352699 | A1* | 12/2016 | Sinclair | G16C 99/00 |
| 2018/0034784 | A1* | 2/2018 | Sinclair | H04L 63/0428 |
| 2018/0225416 | A1* | 8/2018 | Wong | G16B 25/00 |
| 2018/0365378 | A1* | 12/2018 | Haiminen | G16B 30/00 |
| 2019/0332963 | A1 | 10/2019 | Wong et al. | |
| 2020/0382477 | A1* | 12/2020 | Sinclair | H04L 9/0869 |
| 2021/0381056 | A1* | 12/2021 | Hamel | C12Q 1/6886 |
| 2022/0382730 | A1* | 12/2022 | Noto | G16B 10/00 |

* cited by examiner

200

210

Receive at least a portion of a genetic dataset

220

Identify a first set of DNA markers

230

Identify a second set of DNA markers

240

Determine a plurality of relationship indices

250

Generate a relationship interface

260

Present the relationship interface

300

A vs B chr1: 3,456,482-11,288,757    16.1 cM    1,635 SNPs chr1: 36,990,157-72,571,655    39.7 cM    5,577 SNPs chr1: 117,030,308-152,022,638    15.7 cM    1,029 SNPs chr1: 236,682,113-249,209,139    26.0 cM    2,558 SNPs

C vs B chr1: 777,121-3,587,922    6.2 cM    357 SNPs chr1: 10,924,709-42,036,765    47.7 cM    5,129 SNPs chr1: 112,486,034-152,899,727    21.3 cM    1,880 SNPs chr1: 152,942,189-175,338,418    27.6 cM    3,876 SNPs chr1: 175,431,063-210,750,215    36.6 cM    5,137 SNPs

A vs B
C vs B

METHODS AND SYSTEMS FOR PROTECTING GENETIC DATA

BACKGROUND

This application claims the benefit of and priority to U.S. Provisional Application No. 63/405,745, filed Sep. 12, 2022, which is incorporated by reference herein in its entirety for all purposes.

BACKGROUND

The present disclosure relates generally to the field of data protection. Genetic data can include private and sensitive information and presenting such information may harmfully impact privacy and security of genetic data.

SUMMARY

Some implementations relate to a system for comparing genetic data of at least two individuals to determine a relationship between the at least two individuals and to present the relationship while providing privacy protection of certain genetic data. The system includes one or more processing circuits to receive at least a portion of a first genetic dataset of a first individual and at least a portion of a second genetic dataset. Further, the one or more processing circuits identify a first set of DNA markers based on the first genetic dataset of the first individual. Further, the one or more processing circuits identify a second set of DNA markers based on the second genetic dataset, and wherein the first set of DNA markers based on the first genetic dataset and the second set of DNA markers based on the second genetic dataset at least partially correspond. Further, the one or more processing circuits determine a plurality of relationship indices based on comparing the first set of DNA markers of the first individual with the corresponding second set of DNA markers, wherein comparing the first set of DNA markers and the corresponding second set of DNA markers includes determining a match type of a plurality of match types. Further, the one or more processing circuits generate a relationship interface that includes graphical representations of grouped relationship indices of the plurality of relationship indices, wherein the grouped relationship indices includes at least an aggregated first subgroup based on a first match type of the plurality of match types, and an aggregated second subgroup based on a second match type of the plurality of match types. Further, the one or more processing circuits provide the relationship interface.

Some implementations relate to one or more non-transitory computer-readable storage media having instructions stored thereon that, when executed by a plurality of processing circuits, cause the plurality of processing circuits to receive at least a portion of a first genetic dataset of a first individual and at least a portion of a second genetic dataset. Further, the one or more non-transitory computer-readable storage media having instructions stored thereon that, when executed by a plurality of processing circuits, cause the plurality of processing circuits to identify a first set of DNA markers based on the first genetic dataset of the first individual. Further, the one or more non-transitory computer-readable storage media having instructions stored thereon that, when executed by a plurality of processing circuits, cause the plurality of processing circuits to identify a second set of DNA markers based on the second genetic dataset, and wherein the first set of DNA markers based on the first genetic dataset and the second set of DNA markers based on the second genetic dataset at least partially correspond. Further, the one or more non-transitory computer-readable storage media having instructions stored thereon that, when executed by a plurality of processing circuits, cause the plurality of processing circuits to determine a plurality of relationship indices based on comparing the first set of DNA markers of the first individual with the corresponding second set of DNA markers, wherein comparing the first set of DNA markers and the corresponding second set of DNA markers includes determining a match type of a plurality of match types. Further, the one or more non-transitory computer-readable storage media having instructions stored thereon that, when executed by a plurality of processing circuits, cause the plurality of processing circuits to generate a relationship interface that includes graphical representations of grouped relationship indices of the plurality of relationship indices, wherein the grouped relationship indices includes at least an aggregated first subgroup based on a first match type of the plurality of match types, and an aggregated second subgroup based on a second match type of the plurality of match types. Further, the one or more non-transitory computer-readable storage media having instructions stored thereon that, when executed by a plurality of processing circuits, cause the plurality of processing circuits to provide the relationship interface.

Some implementations relate to a method for comparing genetic data of at least two individuals to determine a relationship between the at least two individuals and to present the relationship while providing privacy protection of certain genetic data, the method implemented by one or more processing circuits. The method includes receiving, by one or more processing circuits, at least a portion of a first genetic dataset of a first individual and at least a portion of a second genetic dataset. Further, the method includes identifying, by the one or more processing circuits, a first set of DNA markers based on the first genetic dataset of the first individual. Further, the method includes identifying, by the one or more processing circuits, a second set of DNA markers based on the second genetic dataset, and wherein the first set of DNA markers based on the first genetic dataset and the second set of DNA markers based on the second genetic dataset at least partially correspond. Further, the method includes determining, by the one or more processing circuits, a plurality of relationship indices based on comparing the first set of DNA markers of the first individual with the corresponding second set of DNA markers, wherein comparing the first set of DNA markers and the corresponding second set of DNA markers includes determining a match type of a plurality of match types. Further, the method includes generating, by the one or more processing circuits, a relationship interface that includes graphical representations of grouped relationship indices of the plurality of relationship indices, wherein the grouped relationship indices includes at least an aggregated first subgroup based on a first match type of the plurality of match types, and an aggregated second subgroup based on a second match type of the plurality of match types. Further, the method includes providing, by the one or more processing circuits, the relationship interface.

Figure 1:
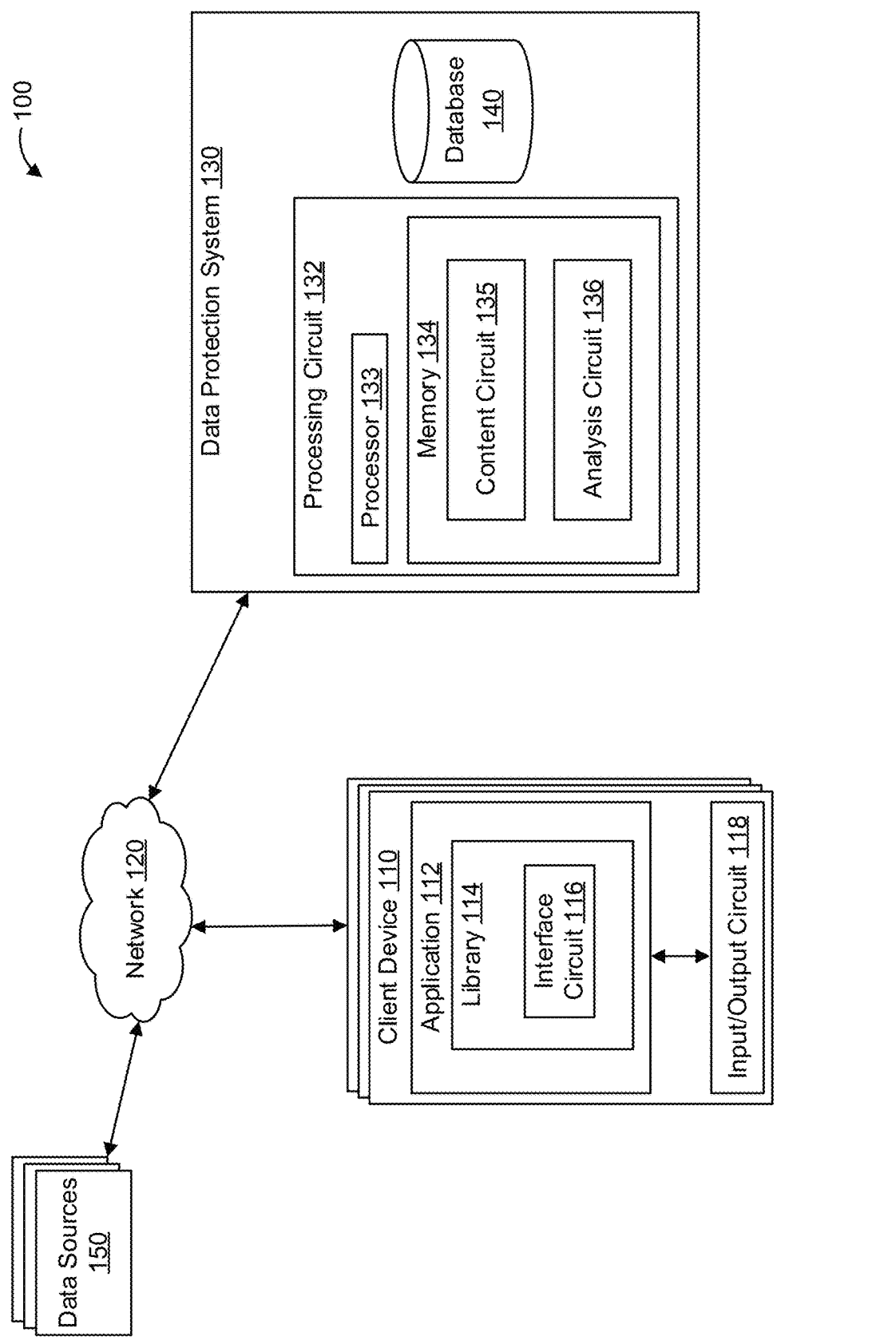
FIG. 1 is a block diagram depicting an example of a system for protecting genetic data, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The present disclosure is directed to systems and methods for protecting data utilizing a genetic protection model. The genetic protection model provides improvements in privacy of genetic data specific to an individual while the graphical user interface (GUI), including the skyline and graphical representations, provide additional improvement to genetic tools for analyzing and determining relationship between a plurality of genetic data; therefore, aspects of the present disclosure address problems in data modelling privacy by maintaining the privacy of genetic dataset utilized to generate output predictions (e.g., relationship indices and relationship interfaces) specific to a particular individual (or individuals). In particular, the ability to present genetic data to a public audience (e.g., jury, grand jury) or submitted as public record (e.g., criminal court records, DNA databases) that is protected, such that accurate, publicly available genetic representations and comparisons cannot be reverse engineered to determine the underlying constituent DNA marker genotypes, provides the genetic protection models and architectures with enhanced performance and efficiency while anonymizing and protecting genetic data of individuals. This approach allows genetic protection models and architectures to maintain the privacy of genetic datasets while providing efficient models that enhance visibility into genetic datasets such that overall design of the genetic protection models and architectures are improved. Thus, aspects of the present disclosure address problems in data modelling architectures by designing and providing a data model that anonymizes and obfuscates genetic data specific to individuals.

The use of the genetic protection model in the systems and methods described in this disclosure provides improvements in data privacy and security. By employing data anonymization and obfuscation, the genetic protection model ensures that the underlying constituent DNA marker genotypes remain protected and cannot be reverse-engineered from the publicly available genetic representations and comparisons. This approach safeguards sensitive genetic data from unauthorized access and maintains the privacy of individuals' genetic datasets. With enhanced privacy measures in place, individuals can have confidence in sharing their genetic information for research, analysis, and relationship determination without compromising their personal privacy. Furthermore, the systems and methods not only protects against known genetic risks but also addresses the challenge of "obfuscated code" in genetic datasets. The obfuscation techniques employed by the model ensure that the underlying genetic data remains secure and private, preventing unauthorized access or reverse engineering.

In addition to enhancing data privacy, the genetic protection model contributes to the improvement of data modeling architectures and designs. By utilizing individual genetic data while obfuscating it with the model, the system ensures that sensitive information remains protected. This approach allows for efficient modeling and analysis without compromising the privacy of the underlying genetic datasets. The genetic protection model provides a framework that anonymizes and safeguards individual genetic data, enabling the development of robust data models that can be applied to various genetic analyses and relationship determinations. The integration of the genetic protection model within data modeling architectures enhances their overall performance and efficiency. By maintaining the privacy of genetic datasets, the model allows for accurate and reliable output predictions, such as relationship indices, while ensuring the anonymity of the underlying genetic information. This combination of privacy protection and data modeling improvements results in improved architectures that can handle large-scale genetic datasets and provide valuable insights without compromising individuals' privacy. Thus, the genetic protection model ensures the privacy and anonymity of individual genetic data while providing effective analysis and relationship determinations. This advancement allows for more comprehensive and secure genetic analysis, protecting sensitive genetic information from unauthorized use and exploitation.

As used herein, "a DNA marker" (sometimes referred to as a "single nucleotide polymorphism" (SNP) or a "genetic marker") is a site of genetic variation wherein at least two alternative variants (known as alleles) are known to occur at meaningful frequencies in one or more populations and may be useful for mapping traits or evaluating genetic relationships. For example, a DNA marker can be a single nucleotide polymorphism (SNP) (or "snip") or other variant types (e.g., inserted or deleted sequence markers, short tandem repeat or repeated sequence marker), where a SNP includes two nucleotides (e.g., adenine (A), cytosine (C), guanine (G), and thymine (T)).

Referring now to FIG. 1, a block diagram depicting an implementation of a system 100 for protecting genetic data. System 100 includes client device(s) 110, data protection system 130, and data sources 150. In various implementations, components of system 100 communicate over network 120. Network 120 may include computer networks such as the Internet, local, wide, metro, or other area networks, intranets, satellite networks, other computer networks such as voice or data mobile phone communication networks, combinations thereof, or any other type of electronic communications network. Network 120 may include or constitute a display network. In various implementations, network 120 facilitates secure communication between components of system 100. As a non-limiting example, network 120 may implement transport layer security (TLS), secure sockets layer (SSL), hypertext transfer protocol secure (HTTPS), and/or any other secure communication protocol.

In general, the client device(s) 110 can execute a software application (such as application 112, e.g., a web browser, an installed application, or other application) to retrieve content from other computing systems and devices over network 120. Such an application may be configured to retrieve interfaces (e.g., related interface) from the data protection system 130. In one implementation, the client device 110 may execute a web browser application, which provides the interface (e.g., from content circuit 135) on a viewport of the client device 110. The web browser application that provides the interface may operate by receiving input of a uniform resource locator (URL), such as a web address, from an input device (such as input/output circuit 118, e.g., a pointing device, a keyboard, a touch screen, or another form of input device). In response, one or more processors of the client device 110 executing the instructions from the web browser application may request data from another device connected to the network 120 referred to by the URL address (e.g., the data protection system 130). The other device may then provide webpage data and/or other data to the client device 110, which causes the interface to be presented by the viewport of the client device 110. Accordingly, the browser window presents the interface to facilitate user interaction with the interface. In some embodiments, the interface (or dashboard) can be presented via an application stored on the client device 110.

The network 120 can enable communication between various nodes, such as the data protection system 130, client device 110, and data sources 150. In some arrangements, data flows through the network 120 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 120 layered over an OSI layer-3 network protocol such as Internet Protocol (IP), e.g., IPv4 or IPv6. The network 120 is composed of various network devices (nodes) communicatively linked to form one or more data communication paths between participating devices. Each networked device includes at least one network interface for receiving and/or transmitting data, typically as one or more data packets. An illustrative network 120 is the Internet; however, other networks may be used. The network 120 may be an autonomous system (AS), i.e., a network that is operated under a consistent unified routing policy (or at least appears to from outside the AS network) and is generally managed by a single administrative entity (e.g., a system operator, administrator, or administrative group).

Client device 110 (sometimes referred to herein as a "mobile device") may be a mobile computing device, smartphone, tablet, smart watch, smart sensor, or any other device configured to facilitate receiving, displaying, and interacting with content (e.g., web pages, mobile applications, etc.). Client device 110 may include an application 112 to receive and display content and to receive user interaction with the content. For example, application 112 may be a web browser. Additionally, or alternatively, application 112 may be a mobile application. Client device 110 may also include an input/output circuit 118 for communicating data over network 120 (e.g., receive and transmit to data protection system 130).

In various implementations, application 112 interacts with a content publisher to receive online content, network content, and/or application content. For example, application 112 may receive and present various interfaces and information resources distributed by the content publisher (e.g., content circuit 135). Interfaces and/or information resources may include web-based content such as a web page or other online documents. The dashboards information resources may include instructions (e.g., scripts, executable code, etc.) that when interpreted by application 112 cause application 112 to display a graphical user interface (GUI) such as an interactable web page and/or an interactive mobile application to a user (e.g., interfaces of FIGS. 3A-3F). In various implementations, application 112 can include one or more application interfaces for presenting an application (e.g., mobile application, web-based application, virtual reality/augmented reality application, smart TV application and so on).

Application 112 is shown to include library 114 having an interface circuit 116. The library 114 may include a collection of software development tools contained in a package (e.g., software development kit (SDK), application programming interface (API), integrated development environment (IDE), debugger, etc.). For example, library 114 may include an application programming interface (API). In another example, library 114 may include a debugger. In yet another example, the library 114 may be an SDK that includes an API, a debugger, and IDE, and so on. In some implementations, library 114 includes one or more libraries having functions that interface with a particular system software (e.g., iOS, Android, Linux, etc.). Library 114 may facilitate embedding functionality in application 112. For example, a user may use library 114 to automatically transmit event logs whenever an event occurs on application 112. As a further example, library 114 may include a function configured to collect and report device analytics and a user may insert the function into the instructions of application 112 to cause the function to be called during specific actions of application 112 (e.g., during presentation of the as described in detail below). In some implementations, interface circuit 116 functionalities are provided by library 114.

Interface circuit 116 can be configured to provide one or more interfaces (e.g., relationship interface). In various implementations, the interfaces can be presented on an application interface of application 112 presented in the viewport of client device 110. The interfaces provided by the interface circuit 116 can include various functionality, such as enabling a user to view protected (or anonymized) genetic data, review output predictions, attributes of the genetic data, DNA markers, and DNA ranges, etc.

In another example implementation, the application 112 executed by the client device 110 can cause a web browser to the display the interfaces on the client device 110. For example, the user may connect (e.g., via the network 120) to a website structured to host the interfaces. In various implementations, interfaces can include infrastructure such as, but not limited to, host devices (e.g., computing device) and a collection of files defining the interface and stored on the host devices (e.g., in database 140). The web browser operates by receiving input of a uniform resource locator (URL) into a field from an input device (e.g., a pointing device, a keyboard, a touchscreen, mobile phone, or another form of input device). In response, the interface circuit 116 executing the interface in the web browser may request data such as from content (e.g., protected genetic data, relationship interfaces, etc.) from database 140. The web browser may include other functionalities, such as navigational controls (e.g., backward, and forward buttons, home buttons). In some implementations, the interface circuit 116 can include both a client-side interface and a server-side interface. For example, a client-side interface can be written in one or more general purpose programming and can be executed by client device 110. The server-side interface can be written, for example, in one or more general purpose programming languages and can be executed by the data protection system 130. Additional details associated with the interface are described in detail with reference to example FIGS. 3A-3F.

Interface circuit 116 may detect events within application 112. In various implementations, interface circuit 116 may be configured to trigger other functionality based on detecting specific events (e.g., selecting relationship parameters, etc.). In various implementations, library 114 includes a function that is embedded in application 112 to trigger interface circuit 116. It should be understood that events may include any action important to a user within an application and are not limited to the examples expressly contemplated herein.

The input/output circuit 118 is structured to send and receive communications over network 120 (e.g., with data protection system 130). The input/output circuit 118 is structured to exchange data, communications, instructions, etc. with an input/output component of the data protection system 130. In one implementation, the input/output circuit 118 includes communication circuitry for facilitating the exchange of data, values, messages, and the like between the input/output circuit 118 and the data protection system 130. In yet another implementation, the input/output circuit 118 includes machine-readable media for facilitating the exchange of information between the input/output device and the data protection system 130. In yet another embodiment, the input/output circuit 118 includes any combination of hardware components, communication circuitry, and machine-readable media.

In some embodiments, the input/output circuit 118 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output circuit 118 may provide an interface for the user to interact with various applications (e.g., application 112) stored on the client device 110. For example, the input/output circuit 118 includes a keyboard, a keypad, a mouse, joystick, a touch screen, a microphone, a haptic sensor, a car sensor, an IoT sensor, a biometric sensor, an accelerometer sensor, a virtual reality headset, smart glasses, smart headsets, and the like. As another example, input/output circuit 118, may include, but is not limited to, a television monitor, a computer monitor, a printer, a facsimile, a speaker, and so on.

Input/output circuit 118 may exchange and transmit data information, via network 120, to all the devices described herein. In various implementations, input/output circuit 118 transmits data via network 120. Input/output circuit 118 may confirm the transmission of data. For example, input/output circuit 118 may transmit requests and/or information to data protection system 130 based on selecting one or more actionable items within the interfaces and dashboards described herein.

The data protection system 130 can include at least one logic device, such as a computing device having a processing circuit configured to execute instructions stored in a memory device to perform one or more operations described herein. The processing circuit may include a microprocessor, an application specific integrated circuit (ASIC), a field-programmable gate array (FPGA), etc., or combinations thereof. The memory may include, but is not limited to, electronic, optical, magnetic, or any other storage or transmission device capable of providing processor with program instructions. The instructions may include code from any suitable computer programming language such as, but not limited to, ActionScript®, C, C++, C#, HTML, Java®, JavaScript®, Perl®, Python®, Visual Basic®, and XML. In addition to the processing circuit, the data protection system 130 may include one or more databases (e.g., 140) configured to store data. The data protection system 130 may also include an interface (e.g., content circuit 135) configured to receive data via the network 120 and to provide data from the content circuit 135 to any of the other systems and devices on the network 120.

The data protection system 130 can be run or otherwise be executed on one or more processors of a computing device, such as those described below in detail with FIG. 4. In broad overview, the data protection system 130 can include a processing circuit 132, a processor 133, memory 134, a content circuit 135, an analysis circuit 136, and a database 140. The interface and dashboards generated by content circuit 135 can be provided to the client devices 110. Generally, the interfaces and dashboards can be rendered at the client devices 110. The content circuit 135 can include a plurality of interfaces and properties, such as those described below in FIGS. 3A-3F. The interfaces can execute at the data protection system 130, the client device 110, or a combination of the two to provide the interfaces and dashboards. In some implementations, the interfaces generated and formatted by content circuit 135 can be provided within a web browser. In another implementation, the content circuit 135 executes to provide the interfaces and dashboards at the client devices 110 without utilizing the web browser.

The data protection system 130 may be a server, distributed processing cluster, cloud processing system, or any other computing device. Data protection system 130 may include or execute at least one computer program or at least one script. In some implementations, data protection system 130 includes combinations of software and hardware, such as one or more processors configured to execute one or more scripts.

Data protection system 130 is shown to include database 140 and processing circuit 132. Database 140 may store received data. For example, the database 140 can include data structures for storing information such as, but not limited to, the genetic data (e.g., minor allele frequency (MAF) amount, a single nucleotide polymorphisms (SNPs) number (with genetic variation), a centimorgan (cM) length (e.g., either in aggregate or of the single longest shared segment), a Bit amount, a megabase (Mb) amount, DNA markers, Chromosome position (inclusive), DNA ranges, DNA attributes, genetic protection model, relationship interfaces, relationship indices, subgroups, etc. Additionally, the genetic data can include coefficient-of-kinship, inbreeding coefficient, relationship degree, and/or lists of equivalent relationship types, all of which may be binned by estimated probabilities. The database 140 can be part of the data protection system 130, or a separate component that the data protection system 130 or the client device 110 can access via the network 120. The database 140 can also be distributed throughout system 100. For example, the database 140 can include multiple databases associated with the data protection system 130, the client device 110, or both. Database 140 may include one or more storage mediums. The storage mediums may include but are not limited to magnetic storage, optical storage, flash storage, and/or RAM. Data protection system 130 may implement or facilitate various APIs to perform database functions (i.e., managing data stored in database 140). The APIs can be but are not limited to SQL, ODBC, JDBC, NOSQL and/or any other data storage and manipulation API.

Processing circuit 132 includes processor 133 and memory 134. Memory 134 may have instructions stored thereon that, when executed by processor 133, cause processing circuit 132 to perform the various operations described herein. The operations described herein may be implemented using software, hardware, or a combination thereof. Processor 133 may include a microprocessor, ASIC, FPGA, etc., or combinations thereof. In many implementations, processor 133 may be a multi-core processor or an array of processors. Memory 134 may include, but is not limited to, electronic, optical, magnetic, or any other storage devices capable of providing processor 133 with program instructions. Memory 134 may include a floppy disk, CD-ROM, DVD, magnetic disk, memory chip, ROM, RAM, EEPROM, EPROM, flash memory, optical media, or any other suitable memory from which processor 133 can read instructions. The instructions may include code from any suitable computer programming language such as, but not limited to, C, C++, C#, Java, JavaScript, Perl, HTML, XML, Python and Visual Basic.

The data sources 150 can provide data to the data protection system 130. In some arrangements, the data sources 150 can be structured to collect data from other devices on network 120 (e.g., user devices 110) and relay the collected data to the data protection system 130. In one example, a user and/or entity may have a server and database (e.g., proxy, enterprise resource planning (ERP) system) that stores genetic data associated with an individual. In this example, the data protection system 130 may request data associated with specific genetic data stored in the data source (e.g., data sources 150) of the individual. For example, in some arrangements, the data sources 150 can host or otherwise support a search or discovery engine for Internet-connected devices. The search or discovery engine (e.g., genetic database) may provide data to the data protection system 130. In some arrangements, the data sources 150 can be collected to provide additional data. The additional data can include newsfeed data geolocation data of individuals on the Internet, governmental databases, and/or any other data associated with the specific individuals or users of interest.

Memory 134 includes content circuit 135. The content circuit 135 may be configured to generate content for displaying to users. For example, the content circuit 135 can generate a relationship interface that includes graphical representations of grouped relationship indices. The content circuit 135 is also structured to provide content (e.g., via a graphical user interface (GUI)) to the user devices 110), over the network 120, for display within the resources. For example, in various arrangements, a relationship interface may be integrated in a mobile application or computing application or provided via an Internet browser. The content from which the content circuit 135 selects may be provided by the data protection system 130 via the network 120 to one or more user devices 110. In such implementations, the content circuit 135 may determine content to be generated and published in one or more content interfaces of resources (e.g., webpages, applications).

Memory 134 may also include analysis circuit 136. The analysis system 136 can be configured to protect genetic data, including generating and/or aggregating various data structures stored in database 140, which may have been acquired as a result of identify chromosomal sequences (e.g., set of DNA markers) and determine relationship indices. For example, the analysis circuit 136 can be configured to aggregate subgroups of relationship indices. The genetic dataset may be a data structure associated with a specific user and include various data such as DNA markers, DNA locations, etc. In some embodiments, the analysis circuit 136 can be configured to generate and/or determine a plurality of relationship indices based on comparing a first set of DNA markers of a first individual and a corresponding second set of DNA markers of a second individual. A sample set of DNA markers is shown below:

TABLE 1

| DNA Marker | Chromosome | Position (or loci) | DNA Marker Genotype |
|---|---|---|---|
| rs4477212 | 1 | 82154 | AA |
| rs3094315 | 1 | 752566 | AA |
| rs3131972 | 1 | 752721 | GG |
| rs12124819 | 1 | 776546 | AA |
| rs11240777 | 1 | 798959 | GG |
| rs6681049 | 1 | 800007 | CC |
| rs4970383 | 1 | 838555 | AC |
| rs4475691 | 1 | 846808 | CT |
| rs7537756 | 1 | 854250 | AG |

Figure 2:
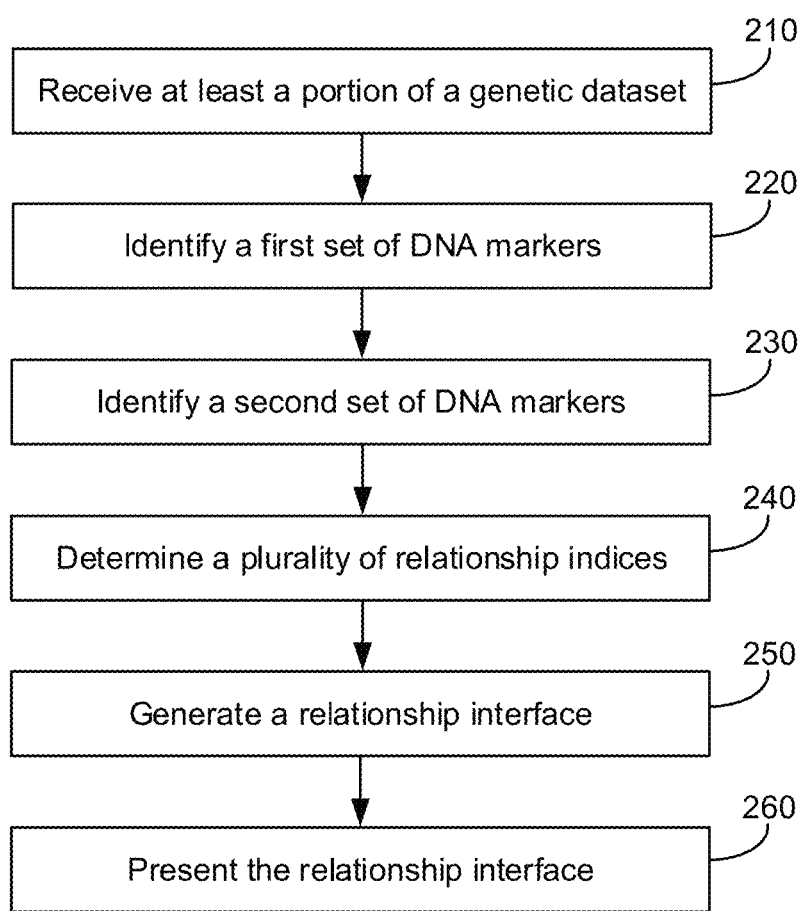
FIG. 2 is a flowchart for a method for comparing genetic data of at least two individuals to determine relationship between the two individuals and to present relationship while providing privacy protection of certain genetic data, according to some arrangements.

Referring now to FIG. 2, a flowchart for a method 200 for comparing genetic data of at least two individuals to determine a relationship between the two individuals and to present relationship while providing privacy protection of certain genetic data, according to some arrangements. Data protection system 130 can be configured to perform method 200. Further, any computing device described herein can be configured to perform method 200. In some implementations, the steps or blocks of method 200 can be executed sequentially or in parallel (e.g., block 220 and 230 can be performed in parallel).

In broad overview of method 200, at block 210, the one or more processing circuits (e.g., data protection system 130 in FIG. 1) can receive at least a portion of a genetic dataset. At block 220, the one or more processing circuits can identify a first set of DNA markers (e.g., Table 1). At block 230, one or more processing circuits can identify a second set of DNA markers. At block 240, the one or more processing circuits can determine a plurality of relationship indices. At block 250, the one or more processing circuits can generate a relationship interface. At block 260, the one or more processing circuits can provide the relationship interface. Additional, fewer, or different operations may be performed depending on the particular arrangement. In some arrangements, some, or all operations of method 200 may be performed by one or more processors executing on one or more computing devices, systems, or servers. In various arrangements, each operation may be re-ordered, added, removed, or repeated.

Method 200 describes a process for protecting the privacy of genetic data utilizing a three stage technique. Accordingly, the described method 200 and systems herein provide an improved data protection architecture for processing and presenting genetic data that is protected for use in various applications (e.g., public records, court documents, presentation). In particular, a first stage includes compression based on grouping the plurality of relationship indices into an aggregated first subgroup and an aggregated second subgroup. A second stage includes encryption based on obfuscating the plurality of relationship indices utilizing graphical representations. A third stage includes obfuscation based on a first attribute and a second attribute (e.g., DNA ranges). In some implementations, method 200 can be executed in parallel or serially by the one or more processing circuits.

Referring to method 200 in more detail, at block 210, the one or more processing circuits (e.g., data protection system 130 in FIG. 1) can receive at least a portion of a first genetic dataset of a first individual and at least a portion of a second genetic dataset. In some arrangements, the genetic dataset can include a plurality of genetic data including, but not limited to, personal data related to the inherited or acquired genetic characteristics of a person (or animal) or an individual, deoxyribonucleic acid (DNA), ribonucleic acid (RNA), DNA marker genotypes (e.g., specific location of a gene or other DNA sequence on a chromosome), historical diseases, disease risk, traits, ancestry, etc. Thus, the one or more processing circuits can receive multiple (e.g., at least 2) genetic datasets of multiple people (e.g., at least 2) that can be analyzed.

At block 220, the one or more processing circuits can identify a first set of DNA markers based on the first genetic dataset of the first individual. At block 230, the one or more processing circuits can identify a second set of DNA markers based on the second genetic dataset, and wherein the first set of DNA markers based on the first genetic dataset and the second set of DNA markers based on the second genetic dataset at least partially correspond (e.g., either directly, or by genetic correlation, linkage disequilibrium, imputation, or inference based on opposite strand comparisons). The one or more processing circuits can identify sets of DNA markers based on historical genetic information indicating positions where DNA information is commonly variable from person to person. In particular, some DNA marker positions can be more likely than other positions to have variable genotypes (or alleles).

In general, parameters (e.g., MAF) can also be used to select loci (i.e., specific location/position or range of locations within the genome) where DNA markers will be compared. The comparison performed at the loci generates a relationship index for each DNA marker. In particular, each SNP can be at a loci or a locus (sometimes referred to herein as a "location") identifying a location or position (inclusive) on a chromosome where a particular gene or DNA marker (or genetic marker) is located. In some arrangements, a set of DNA marker can include one or a plurality of DNA markers (e.g., Table 1). In some implementations, each DNA marker can include at least one (or a group of) single nucleotide polymorphism (SNP) (or "snip"), where a SNP includes two alleles (sometimes referred to as a "DNA marker genotypes") (e.g., DNA molecules including, adenine (A), cytosine (C), guanine (G), and thymine (T)). In some implementations, some SNPs include two potential alleles (with some genetic variation), meaning that in the population typically only two possible nucleotides are at that locus (e.g., position or location). In other implementations, the SNP may only be one allele (sometimes referred to as a "DNA marker genotype") (e.g., A, C, G, or T). In some implementations, some SNPs may include one allele.

For example, a SNP could be "CG" (i.e., two alleles), such that it includes, in order, the cytosine nucleotide and guanine nucleotide. In another example, a SNP could be "GC", such that it includes, in order, the guanine nucleotide and cytosine nucleotide. In yet another example, a SNP could be "TA", such that it includes, in order, the thymine nucleotide and adenine nucleotide. In yet another example, a SNP could be "AG", such that it includes, in order, the adenine nucleotide and guanine nucleotide. In yet another example, a SNP could be "C", such that it includes the cytosine nucleotide. In various implementations, the order may not be of significance and a match of two SNPs can be consider "AG" and "GA", or vice versa. Additionally, the first set of DNA markers can include a plurality of segments (or runs) of identical single nucleotide polymorphisms (SNPs) (or "snips"). In some arrangements, the set of DNA markers can also include, but is not limited to, restriction fragment length polymorphisms (RFLPs), variable number of tandem repeats (VNTRs), microsatellites, copy number variants (CNVs), simple sequence length polymorphisms (SSLPs), and restriction fragment length polymorphisms (RFLPs).

In various arrangements, partially corresponding genetic datasets includes comparing the first set of DNA markers of the first individual with the corresponding second set of DNA markers of the second individual further includes determining at least one match between a first chromosome position (e.g., first locus) of the first set of DNA markers and a second chromosome position (e.g., second locus) of the corresponding second set of DNA markers. In particular, the DNA marker genotypes (or alleles) can be compared. The corresponding second set of DNA markers can be markers at the specific locus or loci (e.g., the same type of DNA marker) of the second individual as compared to the first individual.

Alternative or combinational approaches can be employed for identifying DNA markers and determining their correspondence between individuals. Instead of relying on historical genetic information, other sources of data can be considered. For example, techniques such as genome-wide association studies (GWAS) can provide insights into the variability and correlations of DNA markers across populations. By incorporating data from GWAS or similar studies, the processing circuits can identify DNA markers that exhibit higher levels of variability and establish their correspondence between individuals. Additionally, the selection of loci for DNA marker comparison can be guided by parameters beyond minor allele frequency (MAF). While MAF is commonly used, alternative parameters and criteria can be employed to refine the selection process. In some arrangements, parameters like allele frequency, linkage disequilibrium, or functional significance can be considered. For example, a SNP can be represented by various combinations of alleles. The order of the alleles within the SNP may not always be significant, and different representations of the same SNP can be considered equivalent. Therefore, the comparison of DNA marker genotypes can account for these variations and identify matches irrespective of the allele order. Furthermore, the set of DNA markers can encompass various types of genetic variations beyond single nucleotide polymorphisms (SNPs). These variations can include restriction fragment length polymorphisms (RFLPs), variable number of tandem repeats (VNTRs), microsatellites, copy number variants (CNVs), simple sequence length polymorphisms (SSLPs), and others.

At block 240, the one or more processing circuits can determine a plurality of relationship indices based on comparing the first set of DNA markers of the first individual with the corresponding second set of DNA markers, wherein comparing the first set of DNA markers and the corresponding second set of DNA markers includes determining a match type of a plurality of match types. In particular, the plurality of relationship indices can be determined based on a relationship heuristic for comparing the first set and second set of DNA markers can be customized. The relationship heuristic can be configured based on relationship parameter (sometimes referred to as "relatedness parameters").

In some arrangements, the plurality of relationship indices are further based on one or more relationship parameters, wherein the one or more relationship parameters includes at least one of, but not limited to, a minor allele frequency (MAF) amount (or max allele frequency), a single nucleotide polymorphisms (SNPs) number, a centimorgan (cM) length, a Bit amount, a megabase (Mb) amount, a comparison technique (e.g., first heuristic model (heuristic #1): 4-bit considering A/C/G/T at each site to be different alleles (e.g., if input is A, a match is defined as the compared item being an A), second heuristic model (heuristic #2): 2-bit considering A and T to be equivalent, and C and G to be equivalent (e.g., if the input is an A, the compared item can be an A or T and it is still a match)), and/or a mismatch bunching. For example, prior to determining the plurality of relationship indices the one or more processing circuits can determine the MAF to discard one or more genotypes at a loci that are outside a MAF limit (e.g., min/max MAF). In the following example, the one or more processing circuits can set the MAF limit or a user can customize the MAF limit. Additionally, MAF may be truncated, determined, or selected by minimum MAF, maximum MAF, or both, and/or from different populations and/or sub-populations. In another example, a mismatch bunch can enable, by the one or more processing circuits, two adjacent segments to be merged into one if there is only a single mismatching SNP between them, and if both of them contain a minimum number of SNPs. In other words, it is the minimum segment size before the processing circuits can bridge a single-SNP gap between two segments. By default, this can be set to half of the minimum SNP segment length. In some arrangements, the relationship parameters can also include coefficient-of-kinship, inbreeding coefficient, relationship degree, and/or lists of equivalent relationship types, all of which may be binned by estimated probabilities. In yet another example, prior to determining the plurality of relationship indices the one or more processing circuits can determine a CM length to discard one or more genotypes at a loci that are above or below a cM length (E.g., above 979 cM, below 2436 cM) or above or below a range (e.g., keep all loci within range of 2376 cM to 3720 cM).

In some arrangements, generating the relationship interface includes inputting relationship indices into a genetic protection model, where the genetic protection model is trained (or designed or implemented) to recognize or identify one or more patterns between the first set of DNA markers of the first individual and the corresponding second set of DNA markers (e.g., of the second individual or multiple individuals) based on the one or more relationship parameters. In various arrangements, the corresponding second set of DNA markers can be the same type of DNA markers. In some implementations, training can be performed based on prior sets of DNA markers and pre-defined sets of DNA markers. The genetic protection model can generate an output prediction (e.g., relationship indices) based on the genetic protection model, where the output prediction is specific to a subset of DNA markers of the first set of DNA markers. In general, a set of DNA markers (e.g., segments) can be identified as identical or full match set when the set of DNA markers are all or mostly (e.g., above 75%) identical in both alleles. Additionally, a set of DNA markers (e.g., segments) can be identified as half-identical or partial match set when the set of DNA markers contains at least one allele match at most (e.g., above 75%) loci within the set of DNA markers.

In some arrangements, each DNA marker of the first set of DNA markers can be compared at the corresponding locus (or location) of the second set of DNA markers to determine if they are the same allele. The relationship indices can include determining a plurality of match types of each SNP, where the match types can be defined as a full match (e.g., both alleles match (or one allele matches when it's a one-to-one comparison), such as "AG" is the first individuals SNP, and "AG" is the second individuals SNP, or "A" is the first individuals SNP, and "A" is the second individuals SNP), a partial match (e.g., one allele matches (when at least one individual has two alleles), such as "AG" is the first individuals SNP, and "AA" is the second individuals SNP, or "AG" is the first individuals SNP, and "TG"

is the second individuals SNP, or "A" is the first individuals SNP, and "AG" is the second individuals SNP), or a non-match (e.g., no alleles match, such as "AT" is the first individuals SNP, and "CG" is the second individuals SNP, or "A" is the first individuals SNP, and "G" is the second individuals SNP). The match type can be associated with a color such that graphical representations can depict the match. For example, full match can be depicted as green, partial match can be depicted as yellow, and non-match can be depicted as yellow. It should be understood that matching can be performed on single or multiple alleles, such as a one-to-one comparison (e.g., "A" is the first individuals SNP, and "G" is the second individuals SNP), a two-to-one or one-to-two comparison (e.g., "AG" is the first individuals SNP, and "C" is the second individuals SNP, "G" is the first individuals SNP, and "CT" is the second individuals SNP), or a two-to-two comparison (e.g., "AT" is the first individuals SNP, and "GG" is the second individuals SNP).

In some arrangements, each DNA marker of the first set of DNA markers can be compared at the corresponding locus (or location) of a plurality of sets of DNA markers to determine if each set or the aggregate set (e.g., the plurality of sets of DNA markers) are the same allele. Thus, matching can include a two-to-many or one-to-many comparison, such that a target individual can be compared against a plurality of other individuals. In some arrangements, each of the plurality of other individuals can be compared individually against the target individual to determine a match type (e.g., full match, partial match, non-match such that a plurality of relationship indices can be generated for each comparison. For example, "AT" can be the target individuals SNP, and "GG" is a second individuals SNP, and "AT" is a third individuals SNP, and "T" is the fourth individuals SNP. In the following example, the target individual can be a full match to the third individual, can be a partial match to the fourth individual, and can be a non-match to the second individual. In another example, "T" can be the target individuals SNP, and "GG" is a second individuals SNP, and "AT" is a third individuals SNP, and "T" is the fourth individuals SNP. In the following example, the target individual can be a full match to the third and fourth individuals and can be a non-match to the second individual.

In some arrangements, each of the plurality of other individuals can be compared collectively against the target individual to determine a match type, where the match types can be defined for aggregate matching as a full match, partial match, and non-match based on an aggregate parameters defining the number of matches needed for each match type. For example, the aggregate parameter for a full match may be the alleles of the plurality of other individuals match the target individual by greater than or equal to 80%. Furthermore, the aggregate parameter for a partial match may be the alleles of the plurality of other individuals match the target individual by greater than or equal to 50% (but less than the full match aggregate parameter). Moreover, the aggregate parameter for a non-match may be the alleles of the plurality of other individuals match the target individual by less than 50%. In some arrangements, the one or more processing circuit can set the aggregate parameters for each match type or the user can customize the aggregate parameters. For example, assuming the full match aggregate parameter is allele matches of greater than or equal to 80%, the partial match aggregate parameter is allele matches of greater than or equal to 50% (but less than the full match aggregate parameter), and the non-match aggregate parameter is allele matches of less than 50%, "CT" can be the target individuals SNP, and "TT" is a second individuals SNP, and "TC" is a third individuals SNP, "GT" is the fourth individuals SNP, and "AT" is the fifth individuals SNP. In the following example, the second individual can match 1/2, the third individual can match 2/2, the fourth individual can match 1/2, and the fifth individual can match 1/2. Thus, the one or more processing circuit can aggregate the matches (5/8 or 62.5%) to determine the plurality of other individuals partially match the target individual.

In another example, assuming the full match aggregate parameter is allele matches of greater than or equal to 70%, the partial match aggregate parameter is allele matches of greater than or equal to 50% (but less than the full match aggregate parameter), and the non-match aggregate parameter is allele matches of less than 50%, "CT" can be the target individuals SNP, and "CT" is a second individuals SNP, and "TC" is a third individuals SNP, "C" is the fourth individuals SNP, "TT" is the fifth individuals SNP, and "CT" is the sixth individuals SNP. In the following example, the second individual can match 2/2, the third individual can match 2/2, the fourth individual can match 1/2, the fifth individual can match 1/2, and the sixth individual can match 2/2. Thus, the one or more processing circuit can aggregate the matches (8/10 or 80%) to determine the plurality of other individuals fully match the target individual.

In yet another example, assuming the full match aggregate parameter is allele matches of greater than or equal to 50% (e.g., knowing the target individual has one allele at the particular loci), the partial match aggregate parameter is allele matches of greater than or equal to 20% (but less than the full match aggregate parameter), and the non-match aggregate parameter is allele matches of less than 20%, "T" can be the target individuals SNP, and "CT" is a second individuals SNP, and "TC" is a third individuals SNP, "C" is the fourth individuals SNP, "TT" is the fifth individuals SNP, and "CT" is the sixth individuals SNP. In the following example, the second individual can match 1/2, the third individual can match 1/2, the fourth individual can match 0/2, the fifth individual can match 1/2, and the sixth individual can match 1/2. Thus, the one or more processing circuit can aggregate the matches (4/10 or 40%) to determine the plurality of other individuals fully match the target individual.

Alternative or combinational methods can be employed for determining relationship indices based on the comparison of DNA markers between individuals. In addition to the relationship parameters mentioned earlier, other factors can be considered. For example, instead of using a specific comparison technique, such as the mentioned heuristic models, alternative techniques can be utilized. These techniques may involve different ways of categorizing alleles and defining matches, taking into account various genetic variations and relationships. For example, a technique could be designed to consider additional genetic variations beyond single nucleotide polymorphisms, such as insertions or deletions, to refine the determination of match types. In certain arrangements, the relationship parameters used to determine the relationship indices can be expanded to include additional factors. These factors might include coefficients of kinship, inbreeding coefficients, relationship degrees, or lists of equivalent relationship types. By incorporating these parameters, the processing circuits can assess the genetic relatedness between individuals from multiple perspectives, providing a more comprehensive analysis. Moreover, these parameters can be categorized and binned based on estimated probabilities.

Prior to determining the relationship indices, further analysis and filtering can be performed based on additional criteria. For example, the processing circuits can evaluate the centimorgan (cM) length between DNA markers to discard genotypes that exceed certain cM length thresholds or fall outside specific cM length ranges. By considering the cM length, the processing circuits can filter out genetic markers that may not be relevant to the desired analysis, ensuring a more targeted and accurate representation of the relationship indices. The relationship indices, along with the corresponding match types, can serve as a foundation for generating the relationship interface. By inputting the relationship indices into a genetic protection model, patterns and associations between DNA markers can be recognized. The genetic protection model can be trained on various sets of DNA markers and predefined patterns to develop a predictive capability. This enables the model to generate output predictions specific to subsets of DNA markers within the first set. The output predictions, based on the genetic protection model, provide valuable insights into the genetic relationship between individuals, contributing to the overall relationship interface.

Additionally, the relationship interface can accommodate scenarios where the corresponding second set of DNA markers is of the same type as the first set. This allows for more accurate comparisons and analysis, as the interface can focus on specific genetic variations that are common between individuals. The comparison of DNA markers can extend beyond a one-to-one or one-to-many comparison. In some arrangements, each DNA marker of the first set can be compared at the corresponding locus to multiple sets of DNA markers simultaneously. This approach enables the identification of allele matches across a broader range of individuals, facilitating a more comprehensive assessment of genetic relationships. Aggregate matching techniques can be utilized to determine the overall match type between a target individual and a plurality of other individuals. The match types, such as full match, partial match, or non-match, are defined based on aggregate parameters that specify the required number of matches for each match type. The processing circuits can adjust these aggregate parameters to suit specific analysis requirements or user preferences. Furthermore, the processing circuits can aggregate the relationship indices and their match types based on the defined aggregate parameters. By considering the collective matches of the plurality of other individuals, the processing circuits can determine the overall match type between the target individual and the group.

At block 250, the one or more processing circuits can generate a relationship interface (also referred to as a "relationship graphical user interface (GUI)" or "relationship application user interface") that includes graphical representations of grouped relationship indices of the plurality of relationship indices, wherein the grouped relationship indices includes at least an aggregated first subgroup based on a first match type of the plurality of match types, and an aggregated second subgroup based on a second match type of the plurality of match types. The relationship interface can include vertical representations (or orthogonally oriented, or linear representations (e.g., column), or grid-based representations), where the aggregated first subgroup of the grouped relationship indices is grouped based on non-continuous degrees of similarities between the first set of DNA markers of the first individual and the corresponding second set of DNA markers, and wherein the first set of DNA markers and the second set of DNA markers are non-continuous chromosomal sequences. For example, if the DNA markers of one sequence include A (position 1), A (position 2), T (position 3), C (position 4) (or collectively AATC), and the second sequence is A, A, G, C (or collectively AAGC), there would be a non-continuous similarity, as there is a difference in position 3. Accordingly, the one or more processing circuits can tolerate some conflicts (e.g., 2 conflicts for every 10 positions, 5 conflicts for every 10 positions, 15 conflicts for every 40 positions, etc.) (also referred to herein as "non-matches") in a sequence region while still generating relationship indices and relationship interface. Additional details regarding the relationship interface is shown with reference to FIGS. 3A-3B.

Figure 3A:
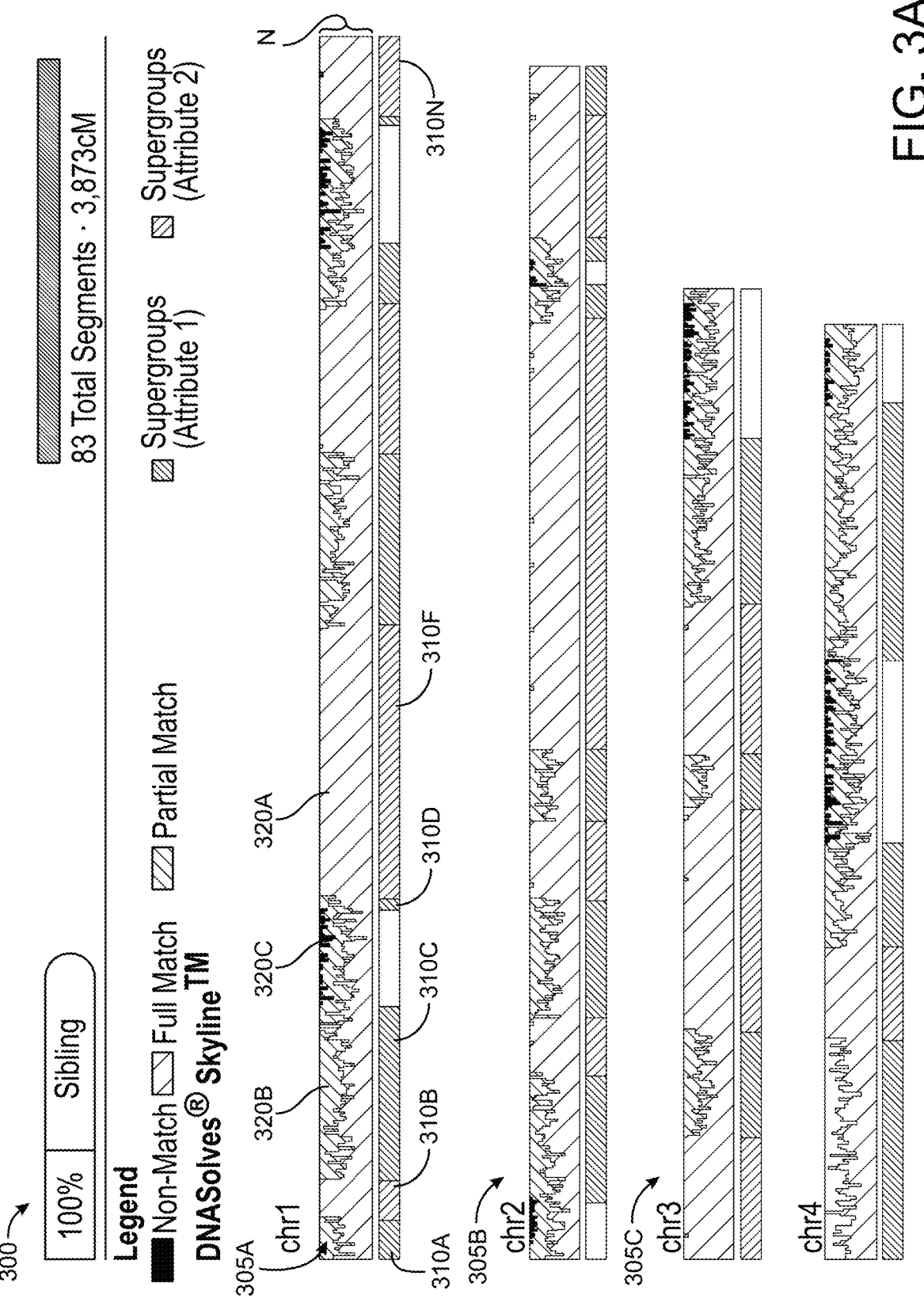
FIG. 3A-3H are example illustrations of depicting a relationship interface, according to some arrangements.
Figure 3A:
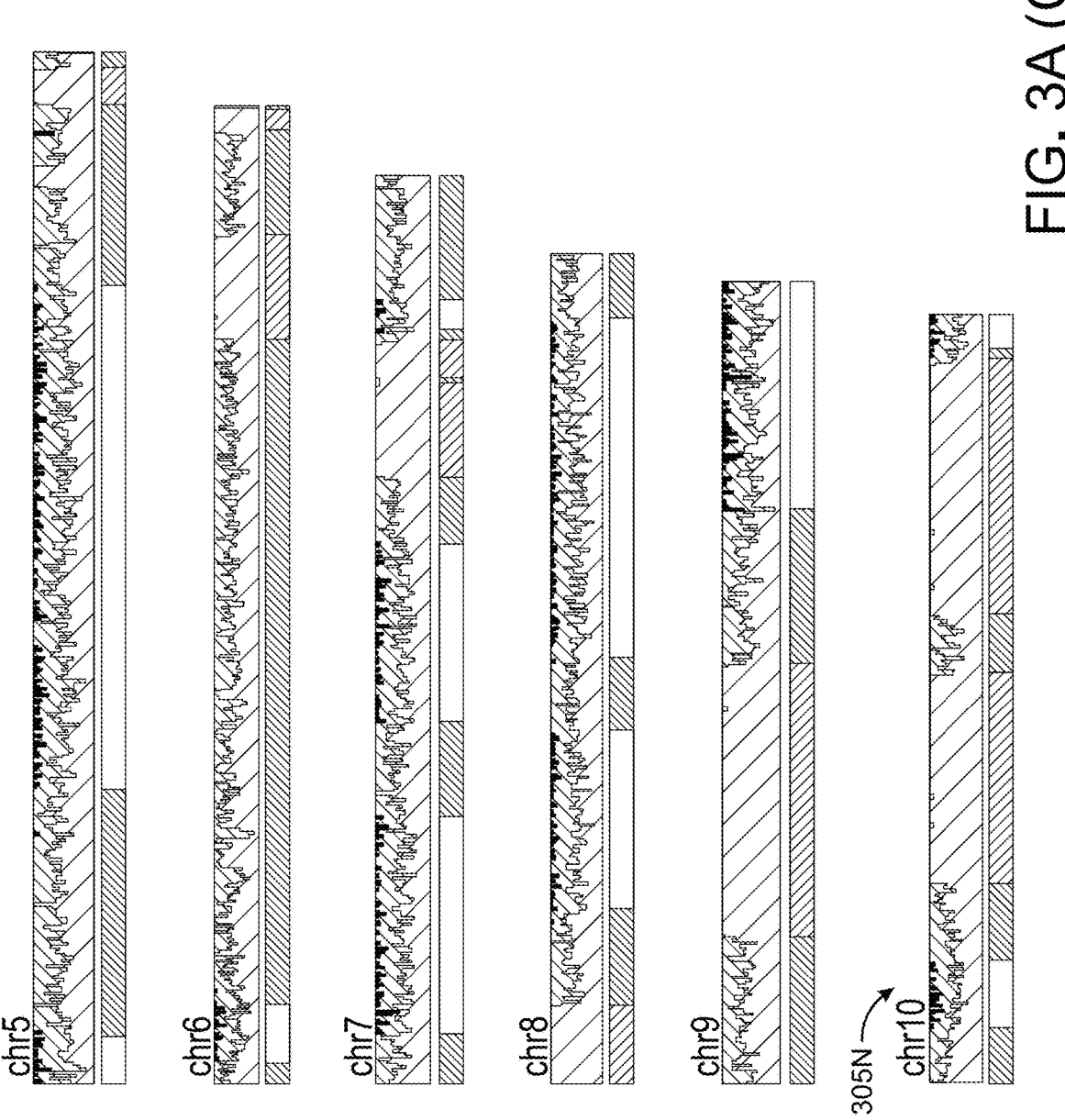
Figure 3B:
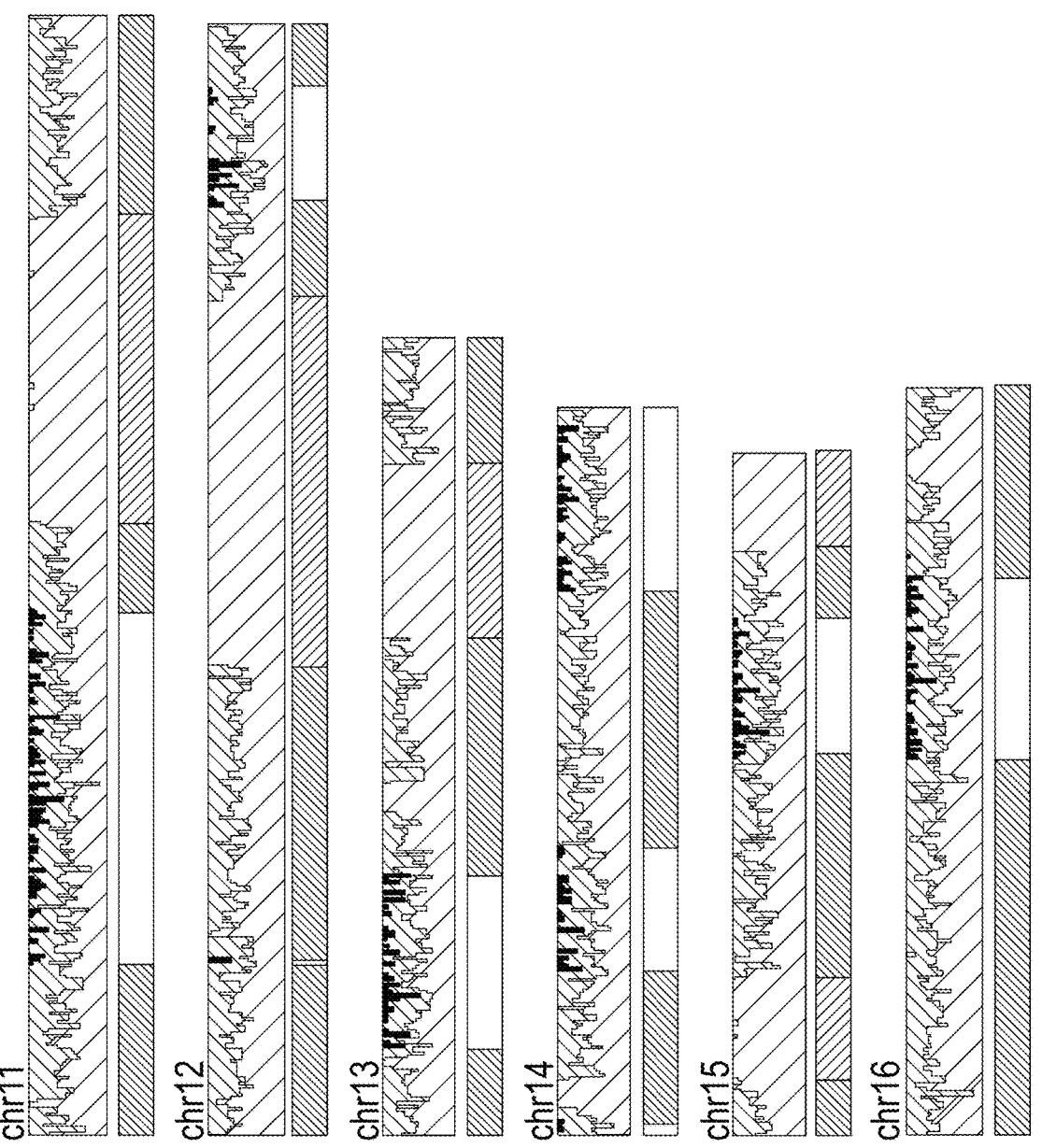
Figure 3B:
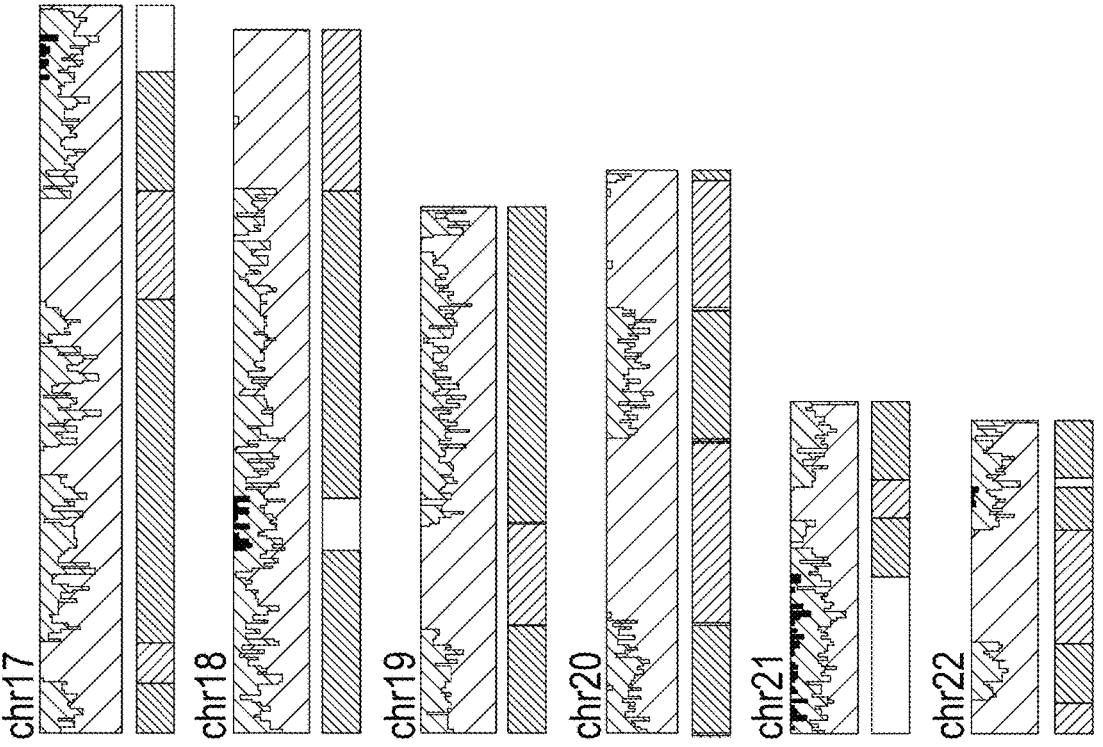
Figure 3C:
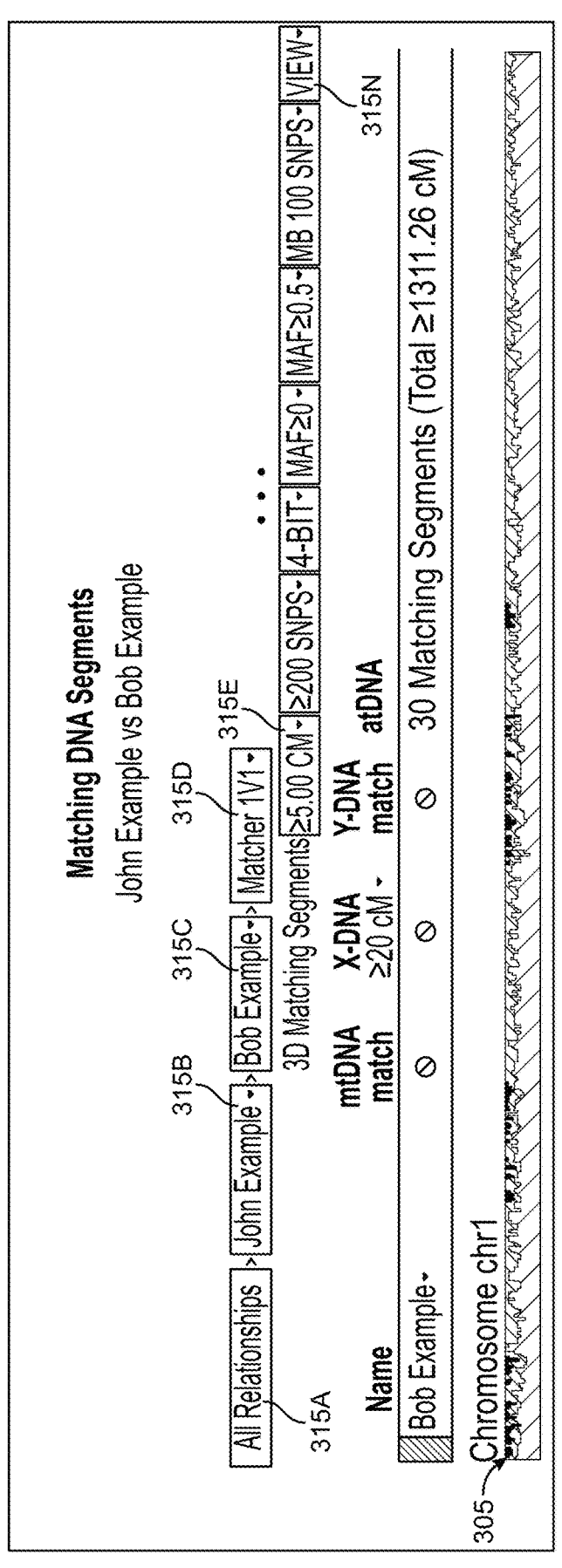
Figure 3D:
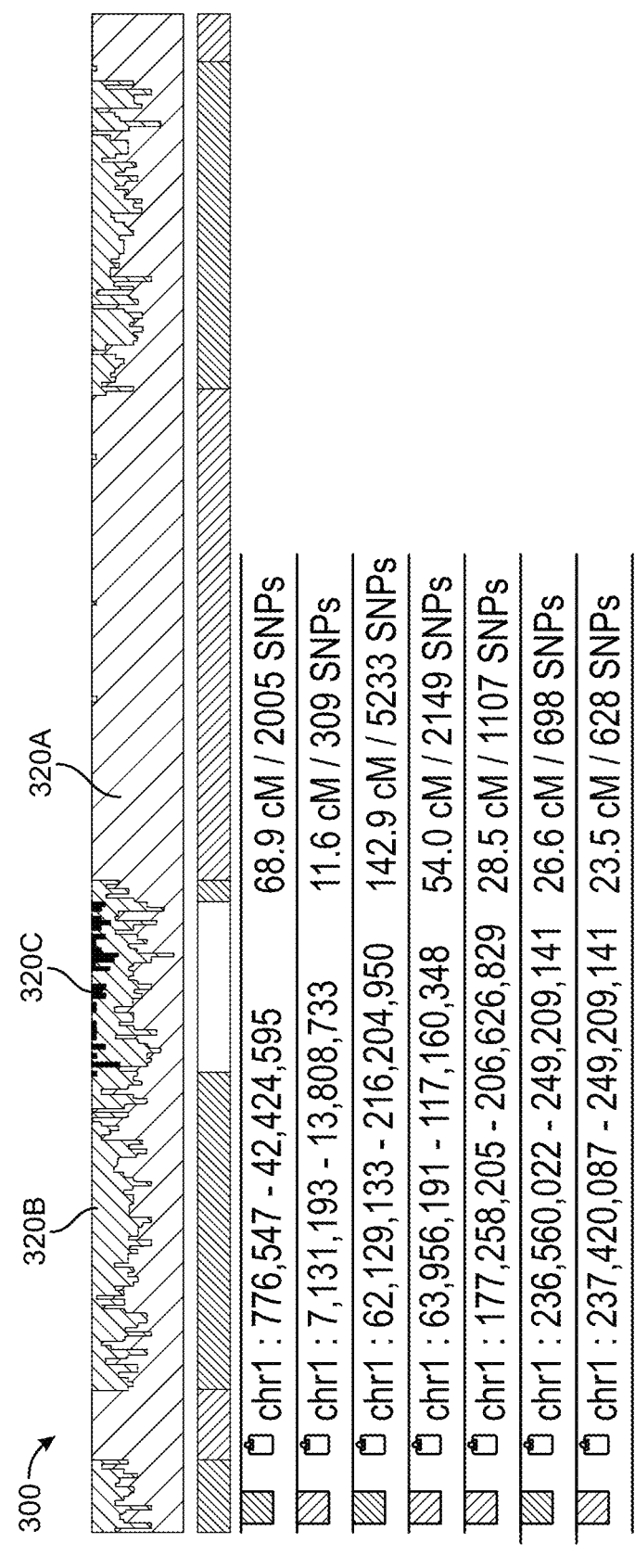
Figure 3E:
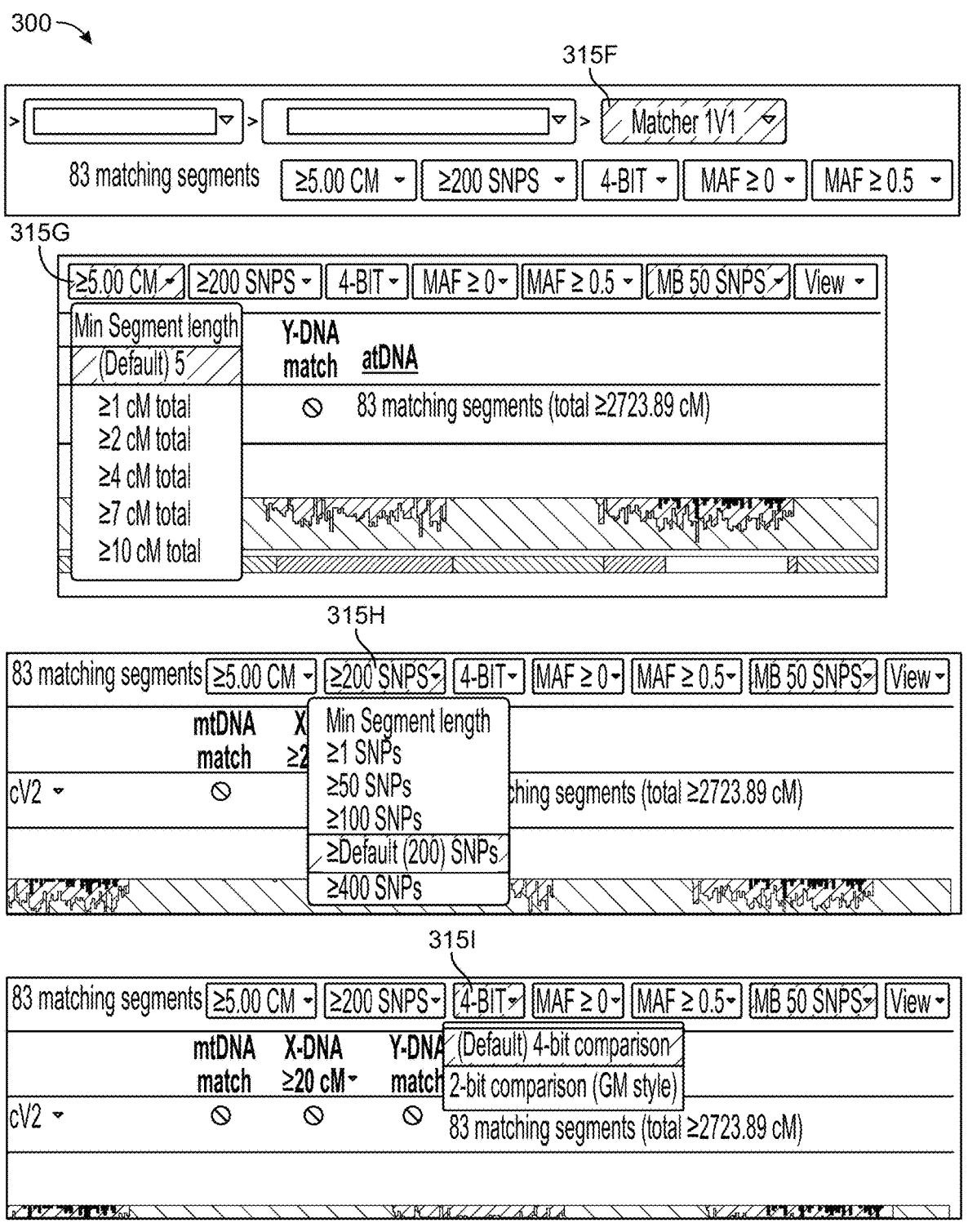
Figure 3F:
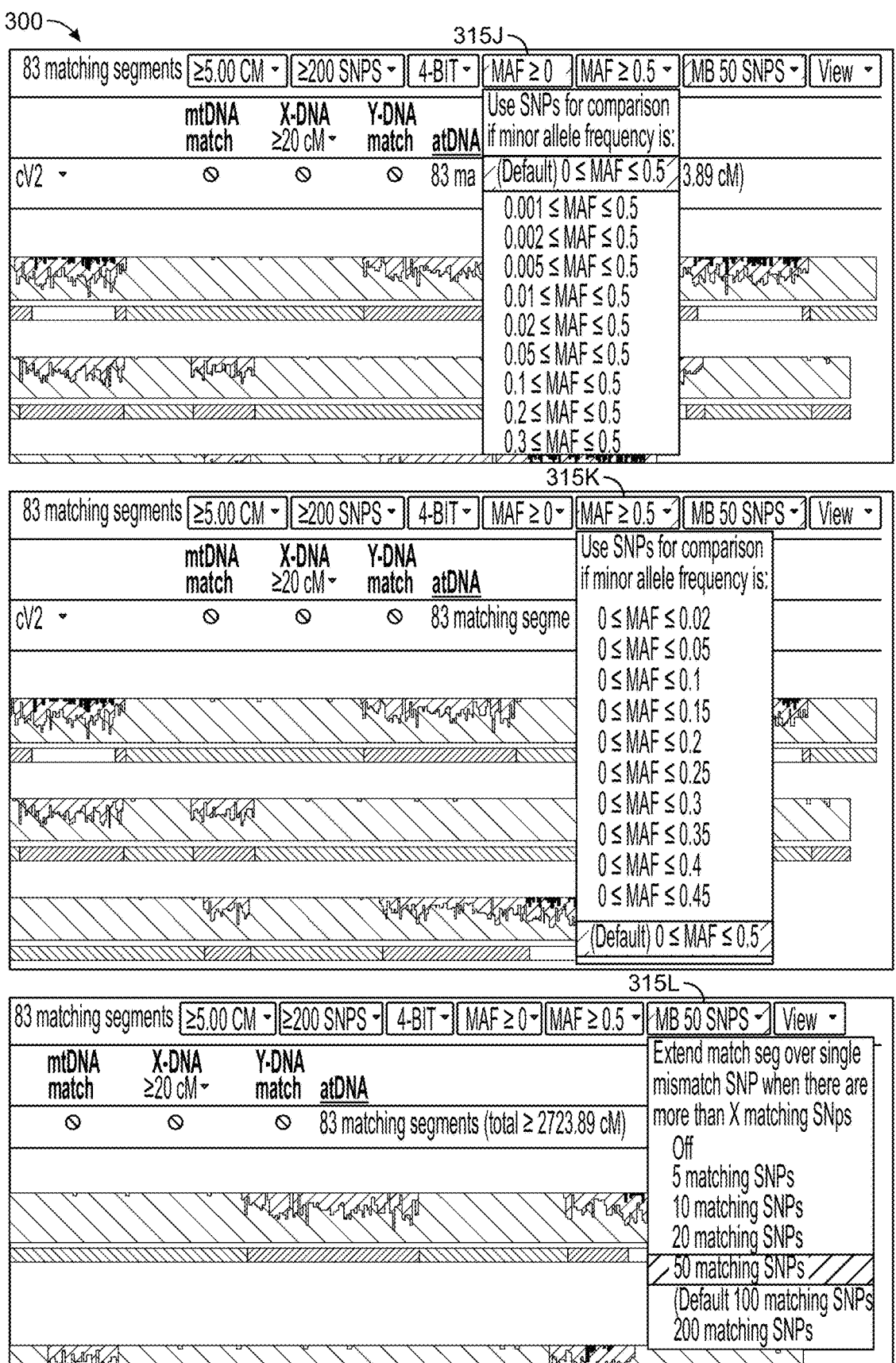
Figure 3G:
Figure 3H:
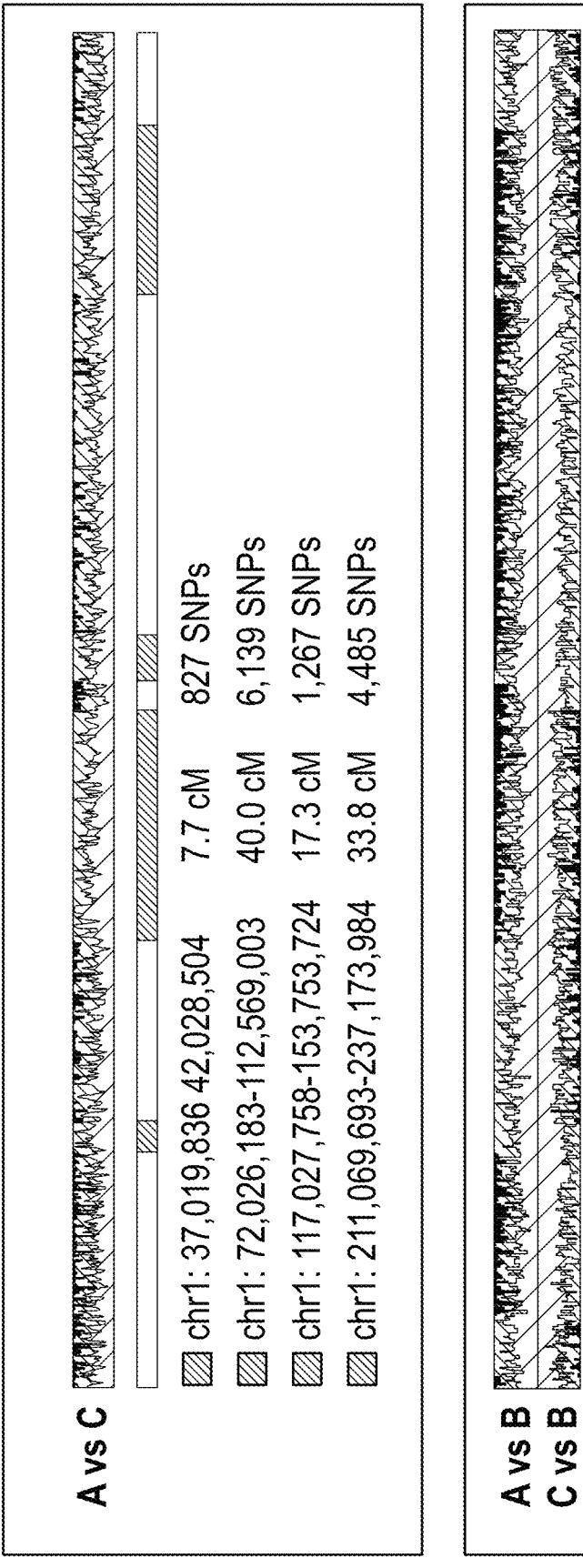

In some arrangements, the relationship interface also includes at least a first attribute and a second attribute (e.g., horizontal representations or orthogonally orientation), where the first attribute identifies a first supergroup of at least two grouped relationship indices, and where second genetic dataset is of a second individual or a plurality of individuals (one individual to one individual, one individual to many individuals, or many individuals to one individual, shown with reference to FIGS. 3H-3G). For example, the first attribute is associated with a first DNA range, and wherein the first DNA range is between a first chromosome position and a second chromosome position. In the following example, the relationship interface can include or indicate the first DNA range between the first chromosome position and the second chromosome position, and where the first attribute is presented in a first color (or shading or distinctly identifying).

The relationship interface (or application user interface) can include a plurality of interactive elements associated with representations of protected genetic data. In some arrangements, the presented relationship interface can be generated and configured by the content circuit 135 based on the one or more libraries or one or more frameworks (e.g., look and feel). As described with reference to FIG. 1, the client device 110 and the data protection system 110 can establish a connection. In other embodiments, the client device 110 may host a client application that generates and provides the relationship interface. In various arrangements, the relationship interface can be hosted by the data protection system 110.

At block 260, the one or more processing circuits can provide the relationship interface. For example, the relationship interface can be presented in a viewport of the user device 110 via a webpage. In another example, the relationship interface can be presented in a viewport of the user device 110 via an application (e.g., 112) installed on user device 110. In each example, the user of the user device 110 may interact with various objects and content of the relationship interface. In some implementations, the relationship interface may be stored in a report which can be presented on a user device 110.

In some embodiments, the processing circuits determine a plurality of relationship indices based on the comparison of the first set of DNA markers with the corresponding second set of DNA markers. These relationship indices can be further based on one or more relationship parameters, such as minor allele frequency (MAF) amount, single nucleotide polymorphisms (SNPs) number, centimorgan (cM) length, bit amount, or megabase (Mb) amount. For example, the method may involve calculating relationship indices that consider the MAF values and SNP counts between the DNA markers of individuals A and B.

In some embodiments, the processing circuits generate the relationship interface by inputting the plurality of relationship indices into a genetic protection model. This model is trained to identify patterns between the DNA markers of the first individual and the corresponding second set of DNA markers based on the relationship parameters. Subsequently, an output prediction is generated based on the genetic protection model, specific to a subset of DNA markers from the first set. The generation of the relationship interface is further influenced by this output prediction. For example, the genetic protection model may identify specific genetic patterns related to MAF and generate an output prediction indicating the presence of certain genetic traits between individuals A and B, which is then incorporated into the relationship interface.

In some embodiments, the processing circuits compare the first set of DNA markers of the first individual with the corresponding second set of DNA markers by determining matches between specific chromosome positions. This comparison includes examining the DNA markers at a first chromosome position and matching them with the DNA markers at a corresponding second chromosome position. For example, the method may involve identifying matches between specific SNP positions on chromosome 5 of individual A and the corresponding positions on chromosome 5 of individual B.

In some embodiments, the relationship interface includes at least a first attribute and a second attribute. The first attribute is associated with a first supergroup of grouped relationship indices, and the second attribute is associated with a second genetic dataset, which can be from a second individual or a plurality of individuals. For example, the relationship interface may display a first attribute representing the average genetic similarity within a subgroup of individuals A and B, and a second attribute indicating the overall genetic diversity within a larger population dataset.

In some embodiments, the first attribute in the relationship interface is associated with a first DNA range, which is defined between a first chromosome position and a second chromosome position. The relationship interface includes the representation of this DNA range, visually highlighting the specific genomic region associated with the first attribute. For example, the relationship interface may depict a DNA range on chromosome 12 from position 40,000,000 to 45,000,000, representing a region of interest related to a specific genetic trait.

In some embodiments, privacy protection of certain genetic data is achieved using a three-stage technique. The first stage involves compressing the plurality of relationship indices by grouping them into the aggregated first subgroup and the aggregated second subgroup. The second stage employs encryption techniques to obfuscate the relationship indices using graphical representations. The third stage encompasses additional obfuscation based on the first attribute and the second attribute, further ensuring the confidentiality and privacy of the underlying genetic data. For example, the method may involve encrypting the relationship indices using advanced cryptographic algorithms and applying visual masking techniques that prevent direct identification of specific genetic information.

In some embodiments, the graphical representations of the grouped relationship indices in the relationship interface are presented as vertical representations. The aggregated first subgroup is grouped based on non-continuous degrees of similarities between the DNA markers of individuals A and B. This enables a comprehensive analysis of the genetic relationships, even when the DNA markers and corresponding positions are not continuous along the chromosomes. For example, the relationship interface may display vertical bars where the height and arrangement of the bars represent the varying degrees of genetic similarity between individuals A and B.

In some embodiments, the first set of DNA markers and the corresponding second set of DNA markers are of the same type. This ensures that the comparison process focuses on specific genetic markers that are directly comparable between individuals A and B. For example, the DNA markers can be specific SNPs located at common genomic positions within the individuals' genetic datasets.

In some embodiments, the first match type in the relationship interface represents a full match, indicating a complete genetic match between individuals A and B. The second match type can be at least one of a partial match or a non-match, reflecting varying degrees of genetic similarity or dissimilarity. For instance, the relationship interface may classify certain DNA marker comparisons as full matches when there is an exact match between individuals A and B, while designating other comparisons as partial matches or non-matches when there are minor genetic differences or no significant matches observed.

Referring now to FIGS. 3A-3B, depicting example illustrations of depicting a relationship interface 300, according to some arrangements. The relationship interface 300 enables a user (also referred to herein as a "entity") to review genetic data that is a protected from reverse engineering genotypes of individual loci analyzed. As shown, skylines 305A-305N are a skylines depicting vertical represents of relationship indices that includes a plurality of DNA markers indicated as a match type. In some implementations, the skyline may be orthogonally oriented, a linear representation (e.g., column), grid-based representations, a chart representation, or a graph. In particular, each representation can be relationship indices grouped together and can be N length (e.g., 10 relationship indices, 100 relationship indices, etc.). Additionally, each skyline can include full matches 320A, partial matches 320B, and non-matches 320C. For example, in skyline 305A, various portions include non-match portions (i.e., a relationship index) depicted with vertical representations 320C. Additionally, in skyline 305A, various portions include full matches 320A and partial matches 320B. Furthermore, as shown, various substantial portions of chromosome 4, 5, and 9 include non-match portions.

Furthermore, a plurality of supergroups (e.g., multiple vertical representations) can be associated with an attribute (e.g., 310A-310N) for each skyline (e.g., shown in skyline 305A). For example, one supergroup (shown as "Supergroups (Attribute 2)", 310B, 310F) may be a set of continuous DNA markers that are full matches between a target individual and one or more other individuals. In another example, one supergroup (shown as "Supergroups (Attribute 1)", 310A, 310C, 310D) may be a set of continuous DNA markers that are full matches or partial matches between a target individual and one or more other individuals. Thus, the relationship indices grouped together based on N length can be further grouped by the one or more processing circuits in supergroups based on for example, match type. Additionally, the relationship interface 300 can also provide a recommendation (e.g., sibling, parent, grandparent, second cousin, third aunt, etc.) of the relationship between the target individual and one or more other individuals. For example, as shown, the recommendation indicates the relationship between the protected individual and the known individual is 100% sibling. FIG. 3B includes additional skylines of additional chromosomes with reference to FIG. 3A. Thus, FIGS. 3A-3B depict a skyline comparison of each chromosome of a protected individual and a known individual.

Referring now to FIGS. 3C-3F, depicting example illustrations of depicting a relationship interface 300, according to some arrangements. The relationship interface 300 enables a user (also referred to herein as a "entity") to modify parameters using selectable objects and content (e.g., 315A-315N). Additionally, as shown with reference to FIG. 3D, DNA ranges can be presented for each skyline that indicates the range of the supergroups (with reference to FIG. 3A). For example, the range of supergroups are shown to be presented when non-matches 320C are not present (i.e., only partial matches 320B and/or full matches 320A are shown in the skyline 305A.

FIGS. 3C, 3E, 3F include selectable items 315A, 315B, 315C, and 315D allow the user to create breadcrumbs or drill down to how the DNA is compared (e.g., 315D), who it is compared to (e.g., 315A, 315B, 315C), and how it is compared (e.g., 315E). Selectable item 315F allows the user to compare 1-to-1, 1-to-many, or many-to-1 (additional details shown with reference to FIG. 3G-3H). Selectable item 315G allows the user to filter or sort by a minimum segment length, using CM. Selectable item 315H allows the user to filter or sort by a minimum segment length, using SNPs. Selectable item 315I allows the user to filter or sort the type of comparison (e.g., 4-bit, 2-bit, 6-bit). Selectable item 315J allows the user to filter or sort the results based on a range of MAF. Selectable item 315K allows the user to filter or sort the results based on a range of MAF. Selectable item 315L allows the user to adjust or provide the matching segment (i.e., supergroups as shown with reference to FIG. 3A) after one or more SNP matches (e.g., 5 matches, 10 matches, matches, 50 matches, etc.).

Accordingly, the relationship interface 300, as illustrated in FIGS. 3C-3F, offers a comprehensive set of tools and options for users (referred to as "entities") to modify parameters and gain deeper insights. The interface incorporates selectable objects and content (e.g., 315A-315N), enabling users to interactively navigate through the data. In FIG. 3D, the interface showcases DNA ranges associated with each skyline (including the types of matches 320A, 320B, 320C), providing a visual representation of the supergroups' span (as depicted in FIG. 3A). Various selectable items are available to allow users with greater control over their analysis. For example, selectable items 315A, 315B, 315C, and 315D enable users to create breadcrumbs and drill down into specific aspects of DNA comparison, including the comparison process (315D), the entities being compared (315A, 315B, 315C), and the method of comparison (315E). Furthermore, selectable item 315F allows users to specify whether they want to perform a one-to-one, one-to-many, or many-to-one comparison (further elaborated in FIGS. 3G-3H). Selectable items 315G and 315H provide the ability to filter or sort results based on minimum segment length using different metrics (CM and SNPs, respectively). Users can also fine-tune their comparisons using selectable item 315I to specify the type of comparison (e.g., 4-bit, 2-bit, 6-bit). The relationship interface further empowers users with selectable items 315J and 315K, allowing them to filter or sort results based on a range of MAF (Minor Allele Frequency). Finally, selectable item 315L enables users to adjust or define the matching segment (i.e., supergroups from FIG. 3A) after a certain number of SNP matches, granting them flexibility in refining the results based on their specific requirements (e.g., 5 matches, 10 matches, 20 matches, 50 matches, etc.). With its extensive range of selectable options and interactive elements, the relationship interface 300 provides a flexible platform for users to explore and analyze genetic relationships.

Referring now to FIGS. 3G-3H, depicting example illustrations of depicting a relationship interface 300, according to some arrangements. Specifically, FIG. 3G showcases a one-to-many comparison presented on the relationship interface 300. The diagram demonstrates a comparative analysis between two individuals, A and C, with a common third individual, B. The interface exhibits the pairwise comparisons of A vs. B and C vs. B, providing visualizations for each relationship. Moreover, the interface arranges these comparisons side by side, facilitating a direct observation of the connections between A and B, as well as C and B. To optimize the display, the diagram presents the C vs. B comparison inverted, aligning the matching segments for a coherent representation. Notably, the interface 300 accommodates the combination of supergroups, resulting in the generation of an aggregate supergroup situated below the skyline illustrations (A vs C). This consolidated depiction encompasses the collective genetic information derived from the individual supergroups. In some embodiments, the super grouping below the skylines can include additional information, such as the locations of the super groups, cM, and the number of SNPs.

FIG. 3H includes a comparison between you A vs C directly, and then shows FIG. 3G but this time adding the A vs C segments. This illustration captures a direct comparison between individuals A and C. Additionally, FIG. 3H builds upon the previous representation in FIG. 3G by incorporating the A vs. C segments into the existing one-to-many comparison framework. The design of the diagram employs a 2:1 representation, where specific criteria are utilized to determine the alignment of the segments. Notably, when the non-green (or non-full match) colors align on either the top or bottom portions of the diagram, corresponding segments in the lower supergroup are distinctly highlighted, emphasizing the significance of these regions.

Figure 4:
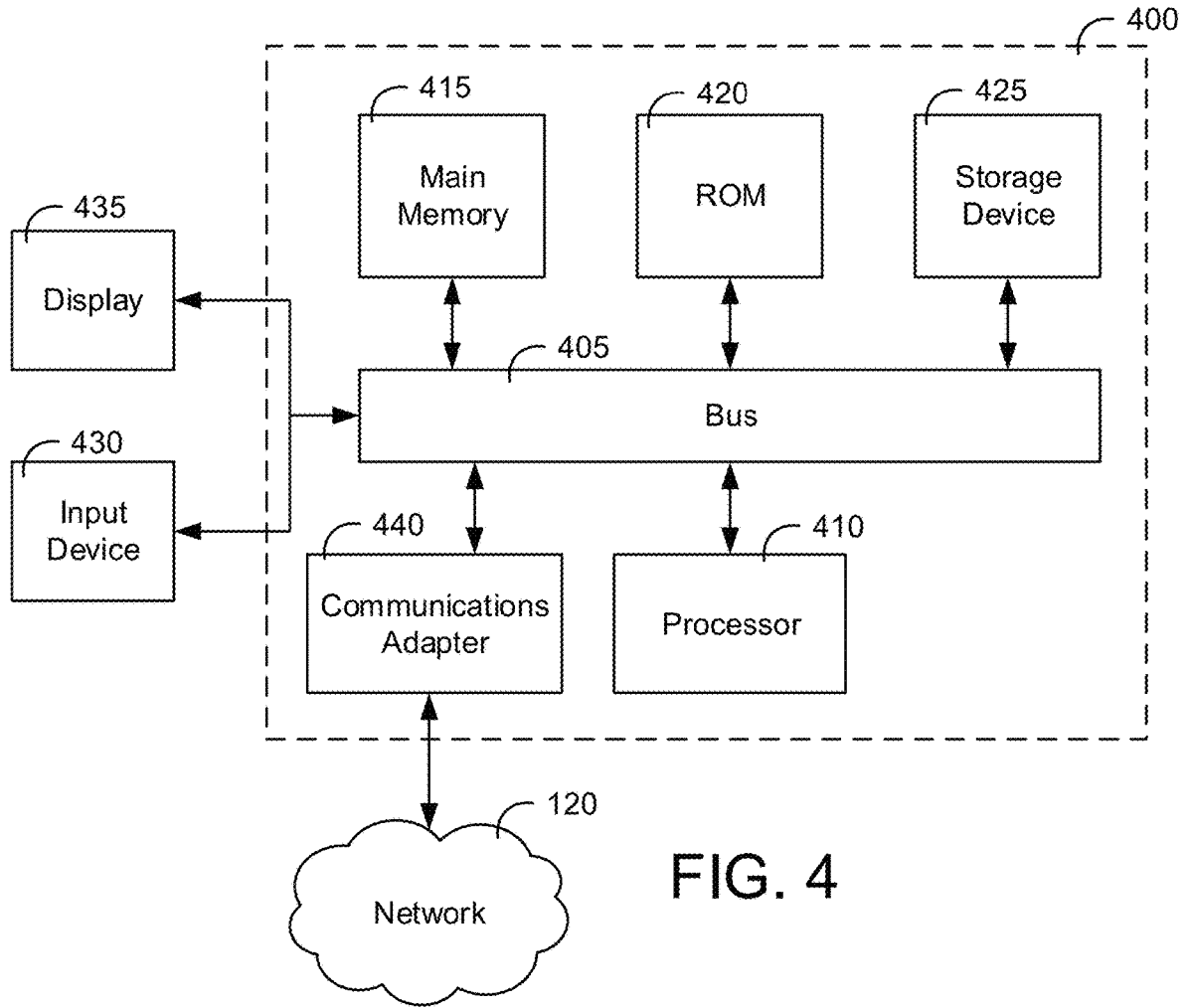
FIG. 4 is a block diagram illustrating an example computing system suitable for use in the various arrangements described herein.

Referring now to FIG. 4, a depiction of a computer system 400 is shown. The computer system 400 that can be used, for example, to implement a system 100, user device(s) 110, data protection system 130, data sources 150, and/or various other example systems described in the present disclosure. The computing system 400 includes a bus 405 or other communication component for communicating information and a processor 410 coupled to the bus 405 for processing information. The computing system 400 also includes main memory 415, such as a random-access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid-state device, magnetic disk, or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information, and command selections to the processor 410. In another arrangement, the input device 430 has a touch screen display 435. The input device 430 can include any type of biometric sensor, a cursor control, such as a mouse, a trackball, or cursor direction keys, for communicating direction information and command selections to the processor 410 and for controlling cursor movement on the display 435.

In some arrangements, the computing system 400 may include a communications adapter 440, such as a networking adapter. Communications adapter 440 may be coupled to bus 405 and may be configured to enable communications with a computing or communications network 120 and/or other computing systems. In various illustrative arrangements, any type of networking configuration may be achieved using communications adapter 440, such as wired (e.g., via Ethernet), wireless (e.g., via Wi-Fi, Bluetooth), satellite (e.g., via GPS) pre-configured, ad-hoc, LAN, WAN.

According to various arrangements, the processes that effectuate illustrative arrangements that are described herein can be achieved by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 4, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 4 as singular, stand-alone devices, one of ordinary skill in the art will appreciate that, in some arrangements, the computing system 400 may include virtualized systems and/or system resources. For example, in some arrangements, the computing system 400 may be a virtual switch, virtual router, virtual host, virtual server. In various arrangements, computing system 400 may share physical storage, hardware, and other resources with other virtual machines. In some arrangements, virtual resources of the network 120 (e.g., network 120 of FIG. 1) may include cloud computing resources such that a virtual resource may rely on distributed processing across more than one physical processor, distributed memory, etc.

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Additionally, features described with respect to particular headings may be utilized with respect to and/or in combination with illustrative arrangement described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements, and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR 3D NOR), EEPROM, MRAM, magnetic storage, hard discs, optical discs, etc. In other embodiments, the volatile storage media may take the form of RAM, TRAM, ZRAM, etc.

Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

What is claimed is:

1. A method for comparing genetic data of at least two individuals to determine a relationship between the at least two individuals and to present the relationship while providing privacy protection of certain genetic data, the method comprising:

receiving, by one or more processing circuits, at least a portion of a first genetic dataset of a first individual and at least a portion of a second genetic dataset;

identifying, by the one or more processing circuits, a first set of DNA markers based on the first genetic dataset of the first individual;

identifying, by the one or more processing circuits, a second set of DNA markers based on the second genetic dataset, and wherein the first set of DNA markers based on the first genetic dataset and the second set of DNA markers based on the second genetic dataset at least partially correspond;

determining, by the one or more processing circuits, a plurality of relationship indices based on comparing the first set of DNA markers of the first individual with the corresponding second set of DNA markers, wherein comparing the first set of DNA markers and the corresponding second set of DNA markers includes determining a match type of a plurality of match types;

generating, by the one or more processing circuits, a relationship interface that includes graphical representations of grouped relationship indices of the plurality of relationship indices, wherein the grouped relationship indices includes at least an aggregated first subgroup based on a first match type of the plurality of match types, and an aggregated second subgroup based on a second match type of the plurality of match types; and providing, by the one or more processing circuits, the relationship interface;

wherein the relationship interface further includes at least a first attribute and a second attribute, and wherein the first attribute is associated with a first supergroup of at least two grouped relationship indices, and wherein the second genetic dataset is of a second individual or a plurality of individuals;

wherein the privacy protection of the certain genetic data utilizes a three stage technique, a first stage comprises compression based on grouping the plurality of relationship indices into the aggregated first subgroup and the aggregated second subgroup, a second stage comprises encryption based on obfuscating the plurality of relationship indices utilizing graphical representations, and a third stage comprises obfuscation based on the first attribute and the second attribute.

2. The method of claim 1, wherein the plurality of relationship indices are further based on one or more relationship parameters, and wherein the one or more relationship parameters comprises at least one of a minor allele frequency (MAF) amount, a single nucleotide polymorphisms (SNPs) number, a centimorgan (cM) length, a Bit amount, a megabase (Mb) amount.

3. The method of claim 2, wherein generating the relationship interface further comprises:

inputting, by the one or more processing circuits, the plurality of relationship indices into a genetic protection model, and wherein the genetic protection model is trained to identify one or more patterns between the first set of DNA markers of the first individual and the corresponding second set of DNA markers based on the one or more relationship parameters; and generating, by the one or more processing circuits, an output prediction based on the genetic protection model, and wherein the output prediction is specific to a subset of DNA markers of the first set of DNA markers, and wherein generating the relationship interface is further based on the output prediction.

4. The method of claim 1, wherein the comparing the first set of DNA markers of the first individual with the corresponding second set of DNA markers further includes determining at least one match between a first chromosome position of the first set of DNA markers and a second chromosome position of the corresponding second set of DNA markers.

5. The method of claim 1, wherein the first attribute is associated with a first DNA range, and wherein the first DNA range is between a first chromosome position and a second chromosome position.

6. The method of claim 5, wherein the relationship interface further comprises the first DNA range between the first chromosome position and the second chromosome position, and wherein the first attribute is presented in a first color.

7. The method of claim 1, wherein the graphical representations of grouped relationship indices comprise vertical representations, and wherein the aggregated first subgroup of the grouped relationship indices is grouped based on non-continuous degrees of similarities between the first set of DNA markers of the first individual and the corresponding second set of DNA markers, and wherein the first set of DNA markers and the second set of DNA markers are non-continuous chromosomal sequences.

8. The method of claim 1, wherein the first set of DNA markers and the corresponding second set of DNA markers are the same type of DNA markers.

9. The method of claim 1, wherein the first match type is a full match and the second match type is at least one of a partial match or a non-match.

10. A system for comparing genetic data of at least two individuals to determine a relationship between the at least two individuals and to present the relationship while providing privacy protection of certain genetic data, the system comprising:

one or more processing circuits configured to:

receive at least a portion of a first genetic dataset of a first individual and at least a portion of a second genetic dataset;

identify a first set of DNA markers based on the first genetic dataset of the first individual;

identify a second set of DNA markers based on the second genetic dataset, and wherein the first set of DNA markers based on the first genetic dataset and the second set of DNA markers based on the second genetic dataset at least partially correspond;

determine a plurality of relationship indices based on comparing the first set of DNA markers of the first individual with the corresponding second set of DNA markers, wherein comparing the first set of DNA markers and the corresponding second set of DNA markers includes determining a match type of a plurality of match types;

generate a relationship interface that includes graphical representations of grouped relationship indices of the plurality of relationship indices, wherein the grouped relationship indices includes at least an aggregated first subgroup based on a first match type of the plurality of match types, and an aggregated second subgroup based on a second match type of the plurality of match types; and provide the relationship interface;

wherein the relationship interface further includes at least a first attribute and a second attribute, and wherein the first attribute is associated with a first supergroup of at least two grouped relationship indices, and wherein the second genetic dataset is of a second individual or a plurality of individuals;

wherein the privacy protection of the certain genetic data utilizes a three stage technique, a first stage comprises compression based on grouping the plurality of relationship indices into the aggregated first subgroup and the aggregated second subgroup, a second stage comprises encryption based on obfuscating the plurality of relationship indices utilizing graphical representations, and a third stage comprises obfuscation based on the first attribute and the second attribute.

11. The system of claim 10, wherein the plurality of relationship indices are further based on one or more relationship parameters, and wherein the one or more relationship parameters comprises at least one of a minor allele frequency (MAF) amount, a single nucleotide polymorphisms (SNPs) number, a centimorgan (cM) length, a Bit amount, a megabase (Mb) amount.

12. The system of claim 10, wherein generating the relationship interface further comprises:

inputting the plurality of relationship indices into a genetic protection model, and wherein the genetic protection model is trained to identify one or more patterns between the first set of DNA markers of the first individual and the corresponding second set of DNA markers based on one or more relationship parameters; and generating an output prediction based on the genetic protection model, and wherein the output prediction is specific to a subset of DNA markers of the first set of DNA markers, and wherein generating the relationship interface is further based on the output prediction.

13. The system of claim 10, wherein the comparing the first set of DNA markers of the first individual with the corresponding second set of DNA markers further includes determining at least one match between a first chromosome position of the first set of DNA markers and a second chromosome position of the corresponding second set of DNA markers.

14. The system of claim 10, further includes at least a first wherein the first set of DNA markers and the corresponding second set of DNA markers are the same type of DNA markers, and wherein the first match type is a full match and the second match type is at least one of a partial match or a non-match.

15. The system of claim 14, wherein the first attribute is associated with a first DNA range, and wherein the first DNA range is between a first chromosome position and a second chromosome position, and wherein the relationship interface further comprises the first DNA range between the first chromosome position and the second chromosome position, and wherein the first attribute is presented in a first color.

16. The system of claim 10, wherein the graphical representations of grouped relationship indices comprise vertical representations, and wherein the aggregated first subgroup of the grouped relationship indices is grouped based on non-continuous degrees of similarities between the first set of DNA markers of the first individual and the corresponding second set of DNA markers, and wherein the first set of DNA markers and the second set of DNA markers are non-continuous chromosomal sequences.

17. One or more non-transitory computer-readable storage media having instructions stored thereon that, when executed by a plurality of processing circuits, cause the plurality of processing circuits to:

receive at least a portion of a first genetic dataset of a first individual and at least a portion of a second genetic dataset;

identify a first set of DNA markers based on the first genetic dataset of the first individual;

identify a second set of DNA markers based on the second genetic dataset, and wherein the first set of DNA markers based on the first genetic dataset and the second set of DNA markers based on the second genetic dataset at least partially correspond;

determine a plurality of relationship indices based on comparing the first set of DNA markers of the first individual with the corresponding second set of DNA markers, wherein comparing the first set of DNA markers and the corresponding second set of DNA markers includes determining a match type of a plurality of match types;

generate a relationship interface that includes graphical representations of grouped relationship indices of the plurality of relationship indices, wherein the grouped relationship indices includes at least an aggregated first subgroup based on a first match type of the plurality of match types, and an aggregated second subgroup based on a second match type of the plurality of match types; and provide the relationship interface;

wherein the relationship interface further includes at least a first attribute and a second attribute, and wherein the first attribute is associated with a first supergroup of at least two grouped relationship indices, and wherein the second genetic dataset is of a second individual or a plurality of individuals;

wherein privacy protection of certain genetic data utilizes a three stage technique, a first stage comprises compression based on grouping the plurality of relationship indices into the aggregated first subgroup and the aggregated second subgroup, a second stage comprises encryption based on obfuscating the plurality of relationship indices utilizing graphical representations, and a third stage comprises obfuscation based on the first attribute and the second attribute.

* * * * *